(12) United States Patent
Kim et al.

(10) Patent No.: US 12,181,923 B2
(45) Date of Patent: *Dec. 31, 2024

(54) DISPLAY DEVICE AND ELECTRONIC DEVICE INCLUDING THE SAME

(71) Applicant: Samsung Display Co., Ltd., Yongin-si (KR)

(72) Inventors: Sungu Kim, Seoul (KR); Ju-Young Park, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,654

(22) Filed: Oct. 31, 2023

(65) Prior Publication Data

US 2024/0061468 A1     Feb. 22, 2024

Related U.S. Application Data

(63) Continuation of application No. 17/858,485, filed on Jul. 6, 2022.

(30) Foreign Application Priority Data

Aug. 2, 2021 (KR) ........................ 10-2021-0101568

(51) Int. Cl.
*G06F 1/16* (2006.01)
(52) U.S. Cl.
CPC .......... *G06F 1/1643* (2013.01); *G06F 1/1616* (2013.01); *G06F 1/1656* (2013.01)

(58) Field of Classification Search
CPC .... G06F 1/1616; G06F 1/1643; G06F 1/1652; G06F 1/1656
See application file for complete search history.

(56) References Cited

U.S. PATENT DOCUMENTS 5,164,542 A * 11/1992 Hart ...................... G06F 1/1656
361/679.02
8,559,192 B2 * 10/2013 Murakata .............. G06F 1/1656
345/905

(Continued)

FOREIGN PATENT DOCUMENTS

JP          6620548 B2    12/2019
JP      2020193314 A     12/2020
(Continued)

*Primary Examiner* — Adrian S Wilson
(74) *Attorney, Agent, or Firm* — CANTOR COLBURN LLP

(57) ABSTRACT

A display device includes a display panel, a lower module, a flexible circuit film, and a conductive adhesive tape. The display panel includes a first non-folding area, a second non-folding area, and a folding area. The lower module is disposed under the display panel. The flexible circuit film is coupled to the display panel, and a portion of the flexible circuit film is disposed on a rear surface of the lower module. The conductive adhesive tape is disposed between the lower module and the flexible circuit film. The conductive adhesive tape includes a conductive nonwoven fabric layer, a first conductive adhesive layer, and a second conductive adhesive layer. The first conductive adhesive layer is disposed between the conductive nonwoven fabric layer and the flexible circuit film, and the second conductive adhesive layer is disposed between the conductive nonwoven fabric layer and the lower module.

30 Claims, 20 Drawing Sheets

(56) References Cited

U.S. PATENT DOCUMENTS

| | | | | |
|---|---|---|---|---|
| 9,063,700 | B2* | 6/2015 | Gilbert | G06F 1/1656 |
| 9,883,583 | B2* | 1/2018 | Cousins | H05K 1/09 |
| 10,124,562 | B2 | 11/2018 | Yamamoto et al. | |
| 10,912,197 | B2 | 2/2021 | Park et al. | |
| 11,138,962 | B2 | 10/2021 | Lee et al. | |
| 11,296,286 | B2 | 4/2022 | Seo et al. | |
| 11,836,004 | B2* | 12/2023 | Kim | G06F 1/1643 |
| 2009/0291303 | A1 | 11/2009 | Kopf et al. | |
| 2010/0245221 | A1* | 9/2010 | Khan | G02F 1/13476 |
| | | | | 345/87 |
| 2011/0102985 | A1* | 5/2011 | Liao | H01Q 1/2266 |
| | | | | 361/679.01 |
| 2011/0222220 | A1* | 9/2011 | Murakata | H05K 9/0054 |
| | | | | 361/679.01 |
| 2012/0194982 | A1* | 8/2012 | Hishida | G06F 1/1656 |
| | | | | 156/308.2 |
| 2014/0376166 | A1* | 12/2014 | Kokai | G06F 1/1643 |
| | | | | 361/679.3 |
| 2015/0024811 | A1* | 1/2015 | Yoon | D03D 1/0082 |
| | | | | 428/196 |
| 2019/0350081 | A1 | 11/2019 | Park et al. | |

FOREIGN PATENT DOCUMENTS

| | | |
|---|---|---|
| JP | 2021092705 A | 6/2021 |
| KR | 1020180068950 A | 6/2018 |
| KR | 1020190130098 A | 11/2019 |
| KR | 1020200068341 A | 6/2020 |
| KR | 1020200087029 A | 7/2020 |
| KR | 1020210000809 A | 1/2021 |
| KR | 1020210063209 A | 6/2021 |

* cited by examiner

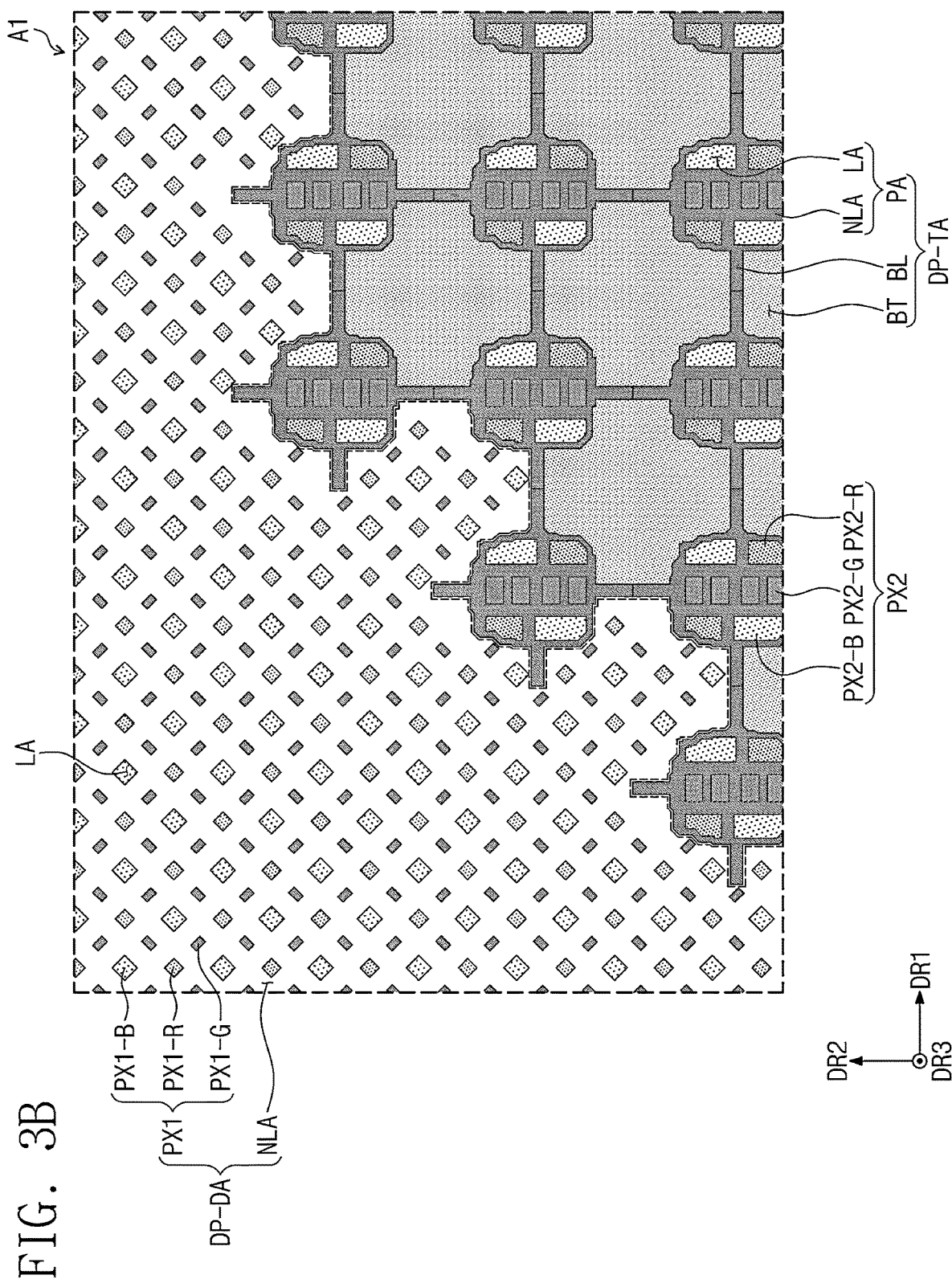

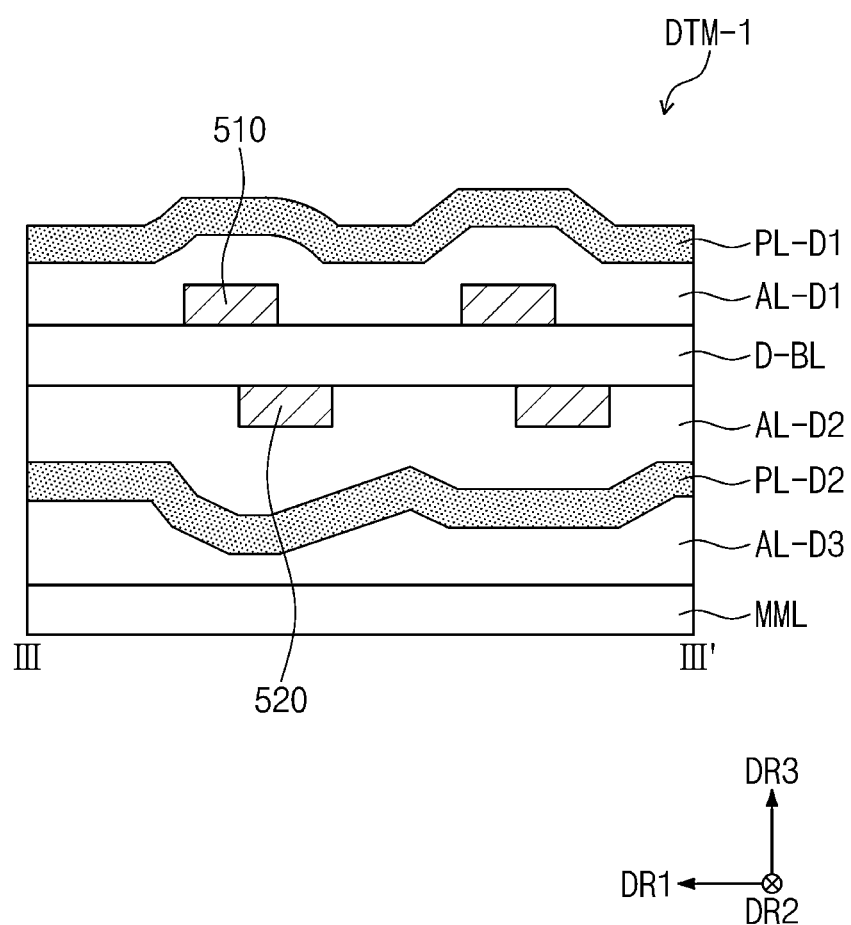

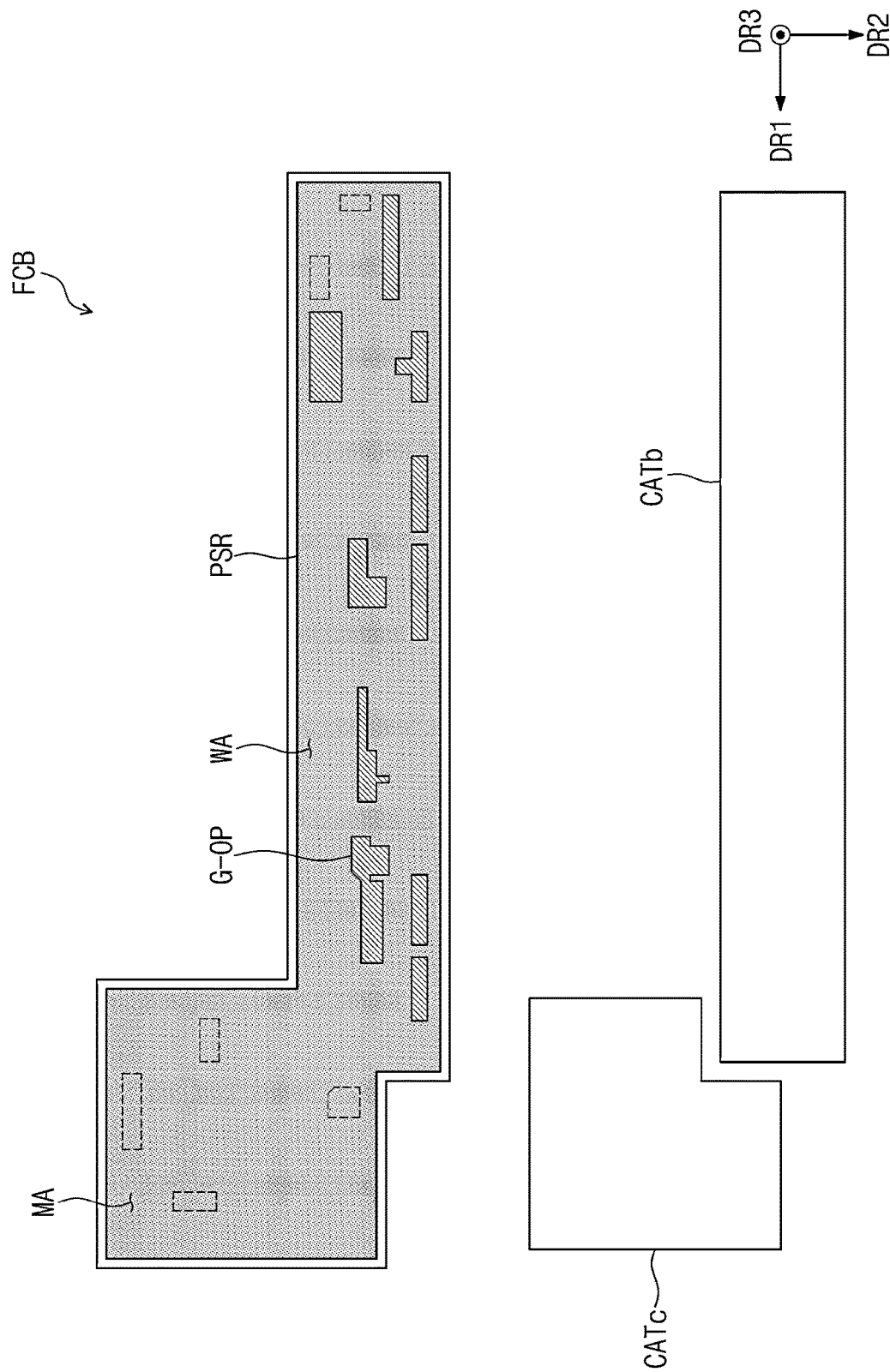

DISPLAY DEVICE AND ELECTRONIC DEVICE INCLUDING THE SAME

This application is a continuation of U.S. patent application Ser. No. 17/858,485, filed on Jul. 6, 2022, which claims priority to Korean Patent Application No. 10-2021-0101568, filed on Aug. 2, 2021, and all the benefits accruing therefrom under 35 U.S.C. § 119, the content of which in its entirety is herein incorporated by reference.

BACKGROUND

1. Field

Embodiments of the disclosure described herein relate to a display device and an electronic device including the display device, and more particularly, relate to a foldable display device and an electronic device including the display device.

2. Description of the Related Art

A display device includes a display area that is activated depending on an electrical signal. Through the display area, the display device may sense an input applied from the outside and may display various images to provide information to a user. With the development of various forms of display devices, display areas having various shapes are implemented.

SUMMARY

Embodiments of the disclosure provide a display device having improved reliability.

Embodiments of the disclosure provide an electronic device including the display device.

According to an embodiment, a display device includes a display panel, a lower module, a flexible circuit film, and a conductive adhesive tape. In such an embodiment, the display panel includes a first non-folding area, a second non-folding area, and a folding area disposed between the first non-folding area and the second non-folding area. In such an embodiment, the lower module is disposed under the display panel, and the flexible circuit film is coupled to the display panel, where a portion of the flexible circuit film is disposed on a rear surface of the lower module. In such an embodiment, the conductive adhesive tape is disposed between the lower module and the flexible circuit film. In such an embodiment, the conductive adhesive tape includes a conductive nonwoven fabric layer, a first conductive adhesive layer disposed between the conductive nonwoven fabric layer and the flexible circuit film, and a second conductive adhesive layer disposed between the conductive nonwoven fabric layer and the lower module.

According to an embodiment, a display device includes a display panel, a lower module, a flexible circuit film, a first conductive adhesive tape, and a second conductive adhesive tape. In such an embodiment, the display panel includes a first non-folding area, a second non-folding area, and a folding area disposed between the first non-folding area and the second non-folding area. In such an embodiment, the lower module is disposed under the display panel, and the flexible circuit film is coupled to the display panel, where a portion of the flexible circuit film is disposed on a rear surface of the lower module. In such an embodiment, the first conductive adhesive tape is disposed between the lower module and a first area of the flexible circuit film, and the second conductive adhesive tape is disposed between the lower module and a second area of the flexible circuit film. In such an embodiment, at least one selected from the first and second conductive adhesive tapes includes a conductive nonwoven fabric layer.

According to an embodiment, an electronic device includes a display device including a sensing area through which an optical signal passes and a display area adjacent to the sensing area and an electro-optical module disposed under the display device to overlap the sensing area, where the electro-optical module receives the optical signal.

In such an embodiment, the display device includes a display panel, a lower module, a flexible circuit film, and a conductive adhesive tape. In such an embodiment, the display panel overlaps the sensing area and the display area, and a partial area of the display panel is folded about a folding axis. In such an embodiment, the lower module is disposed under the display panel, and the flexible circuit film is coupled to the display panel, where a portion of the flexible circuit is disposed on a rear surface of the lower module. In such an embodiment, the conductive adhesive tape is disposed between the lower module and the flexible circuit film. In such an embodiment, the conductive adhesive tape includes a conductive nonwoven fabric layer, a first conductive adhesive layer disposed between the conductive nonwoven fabric layer and the flexible circuit film, and a second conductive adhesive layer disposed between the conductive nonwoven fabric layer and the lower module.

BRIEF DESCRIPTION OF THE DRAWINGS

The above and other features of the disclosure will become apparent by describing in detail embodiments thereof with reference to the accompanying drawings, in which:

FIG. 3B is an enlarged plan view of a partial area in FIG. 3A;

FIG. 6B is a sectional view of the digitizer taken along line illustrated in FIG. 6A;

FIG. 10A is a rear view illustrating the flexible circuit film, the first conductive adhesive tape and the second conductive adhesive tape according to an embodiment of the disclosure;

DETAILED DESCRIPTION

Figure 1A:
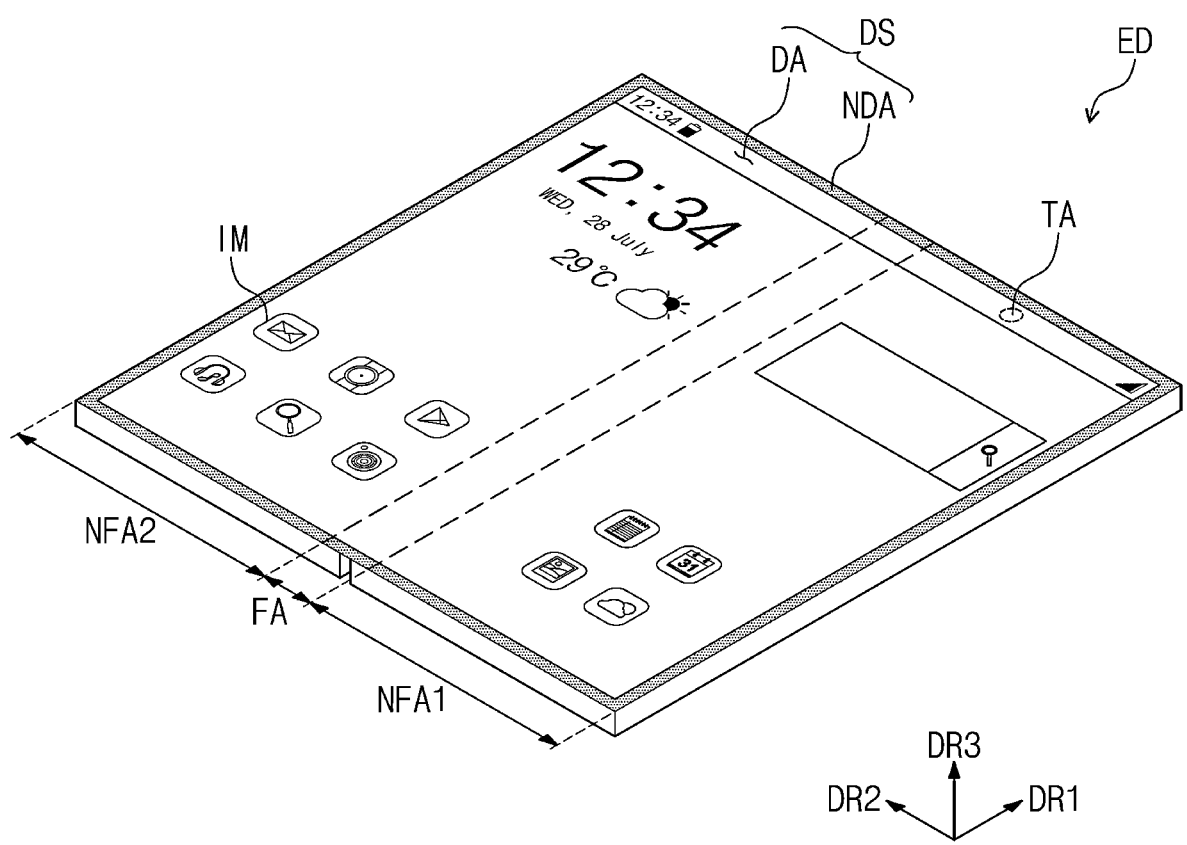
FIGS. 1A to 1C are perspective views of an electronic device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when it is mentioned that a component (or, an area, a layer, a part, etc.) is referred to as being "on", "connected to" or "coupled to" another component, this means that the component may be directly on, connected to, or coupled to the other component or a third component may be therebetween.

Like reference numerals refer to like elements throughout. Additionally, in the drawings, the thicknesses, proportions, and dimensions of components are exaggerated for effective description.

Terms such as "first", "second", and the like may be used to describe various components, but the components should not be limited by the terms. The terms may be used only for distinguishing one component from other components. For example, without departing the scope of the disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined herein.

Hereinafter, embodiments of the disclosure will be described in detail with reference to the accompanying drawings.

Figure 1B:
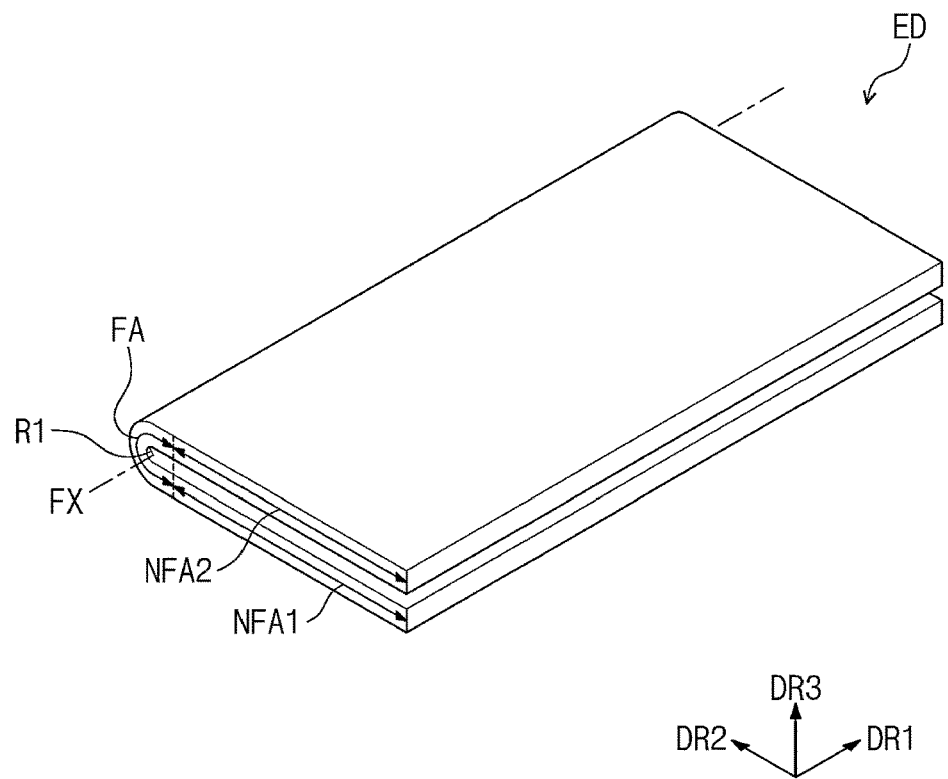
Figure 1C:
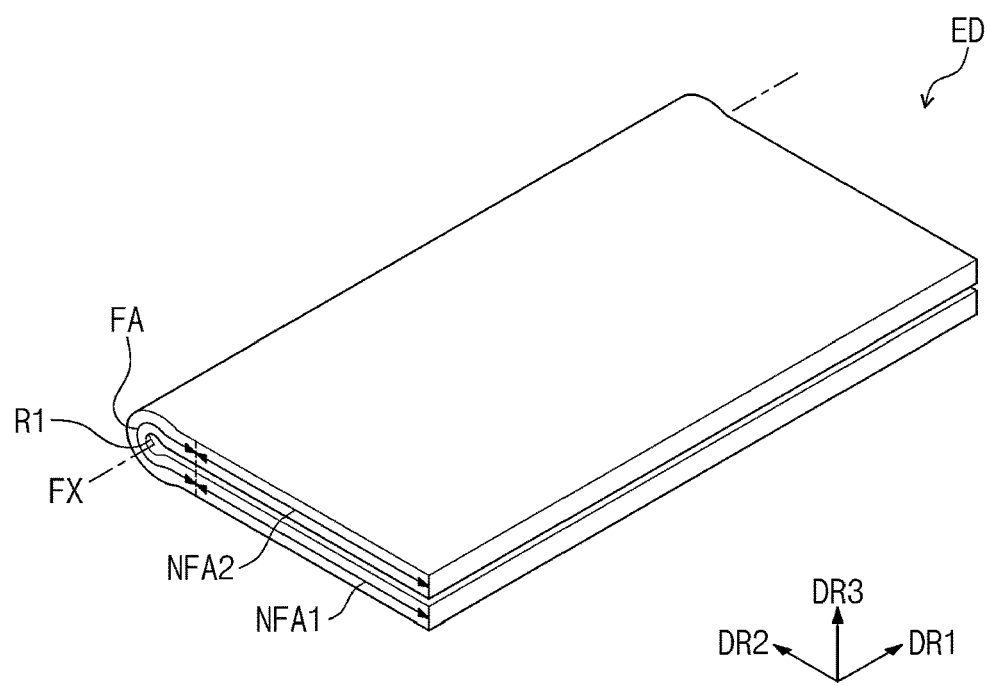

FIGS. 1A to 1C are perspective views of an electronic device ED according to an embodiment of the disclosure. FIG. 1A illustrates an embodiment of the electronic device Ed in a flat or unfolded state, and FIGS. 1B and 1C illustrate an embodiment of the electronic device Ed in folded states.

Referring to FIGS. 1A to 1C, an embodiment of the electronic device ED may include a display surface DS defined by a first direction DR1 and a second direction DR2 crossing the first direction DR1. The electronic device ED may provide an image IM to a user through the display surface DS.

The display surface DS may include a display area DA and a non-display area NDA around the display area DA. The display area DA may display the image IM, and the non-display area NDA may not display the image IM. In an embodiment, as shows in FIG. 1A, the non-display area NDA may surround the display area DA. However, without being limited thereto, the shape of the display area DA and the shape of the non-display area NDA may be variously modified.

The display surface DS may include a sensing area TA. The sensing area TA may be a partial area of the display area DA. In an embodiment, the image IM may be displayed on the sensing area TA. The sensing area TA has a higher transmittance than the other area of the display area DA. Hereinafter, the other area of the display area DA other than the sensing area TA may be defined as a general display area. Hereinafter, for convenience of description, the general display area will be referred to as the display area DA.

An optical signal, for example, visible light or infrared light, may travel through the sensing area TA. The electronic device ED may take an image of an external object through visible light passing through the sensing area TA, or may determine accessibility of the external object through infrared light passing through the sensing area TA. In an embodiment, as shown in FIG. 1A, the electronic device ED may include a single sensing area TA. In an alternative embodiment, without being limited thereto, a plurality of sensing areas TA may be provided.

Herein, a direction substantially perpendicular to a plane defined by the first direction DR1 and the second direction DR2 is defined as a third direction DR3. Front surfaces and rear surfaces of members are distinguished from each other with respect to the third direction DR3. The expression "on the plane" used herein may be defined as a state viewed in the third direction DR3. Hereinafter, the first to third directions DR1, DR2, and DR3 are directions indicated by first to third directional axes, respectively, and the first to third directional axes are denoted by the same reference numerals as those of the first to third directions.

The electronic device ED may include a folding area FA and a plurality of non-folding areas NFA1 and NFA2. The non-folding areas NFA1 and NFA2 may include the first non-folding area NFA1 and the second non-folding area NFA2. The folding area FA may be disposed between the first non-folding area NFA1 and the second non-folding area NFA2 in the second direction DR2.

In an embodiment, as illustrated in FIG. 1B, the folding area FA may be folded about a folding axis FX parallel to the first direction DR1. The folding area FA may be folded with a predetermined curvature or a predetermined radius of curvature R1. The electronic device ED may be folded in an in-folding manner such that the first non-folding area NFA1 and the second non-folding area NFA2 face each other and the display surface DS (refer to FIG. 1A) is not exposed to the outside.

In an embodiment of the disclosure, the electronic device ED may be folded in an out-folding manner such that the display surface DS is exposed to the outside. In an embodiment of the disclosure, the electronic device ED may be configured such that an in-folding or out-folding motion is mutually repeated from an unfolding motion. However, the disclosure is not limited thereto. In an embodiment of the disclosure, the electronic device ED may be configured to select one of an unfolding motion, an in-folding motion, and an out-folding motion.

In an embodiment, as illustrated in FIG. 1B, in a folded state, the vertical distance (that is, the distance in the third direction DR3) between the first non-folding area NFA1 and the second non-folding area NFA2 may be substantially the same as twice the radius of curvature R1. In an alternative embodiment, as illustrated in FIG. 1C, in a folded state, the vertical distance between the first non-folding area NFA1 and the second non-folding area NFA2 may be smaller than twice the radius of curvature R1.

Figure 2A:
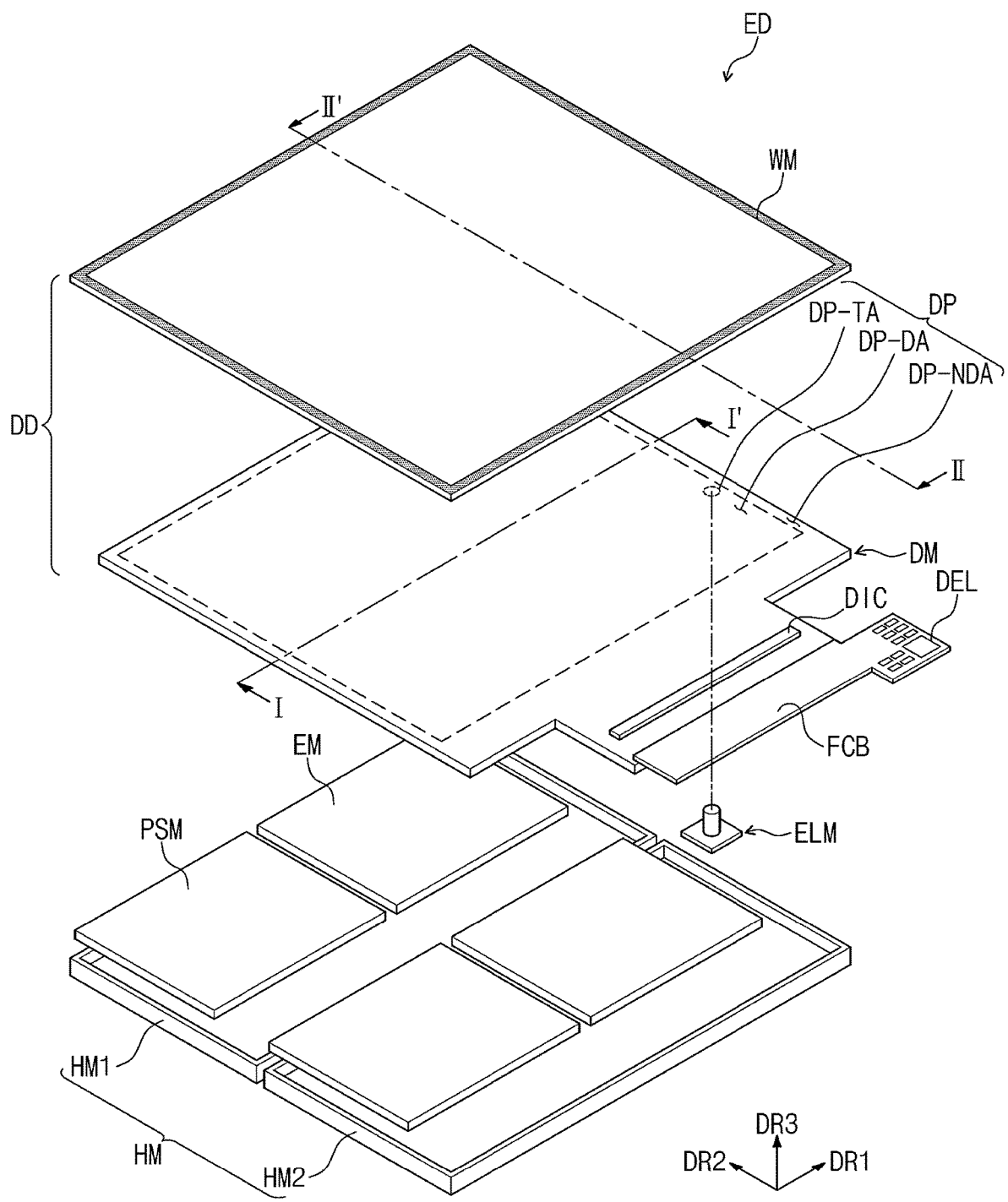
FIG. 2A is an exploded perspective view of the electronic device according to an embodiment of the disclosure.
Figure 2B:
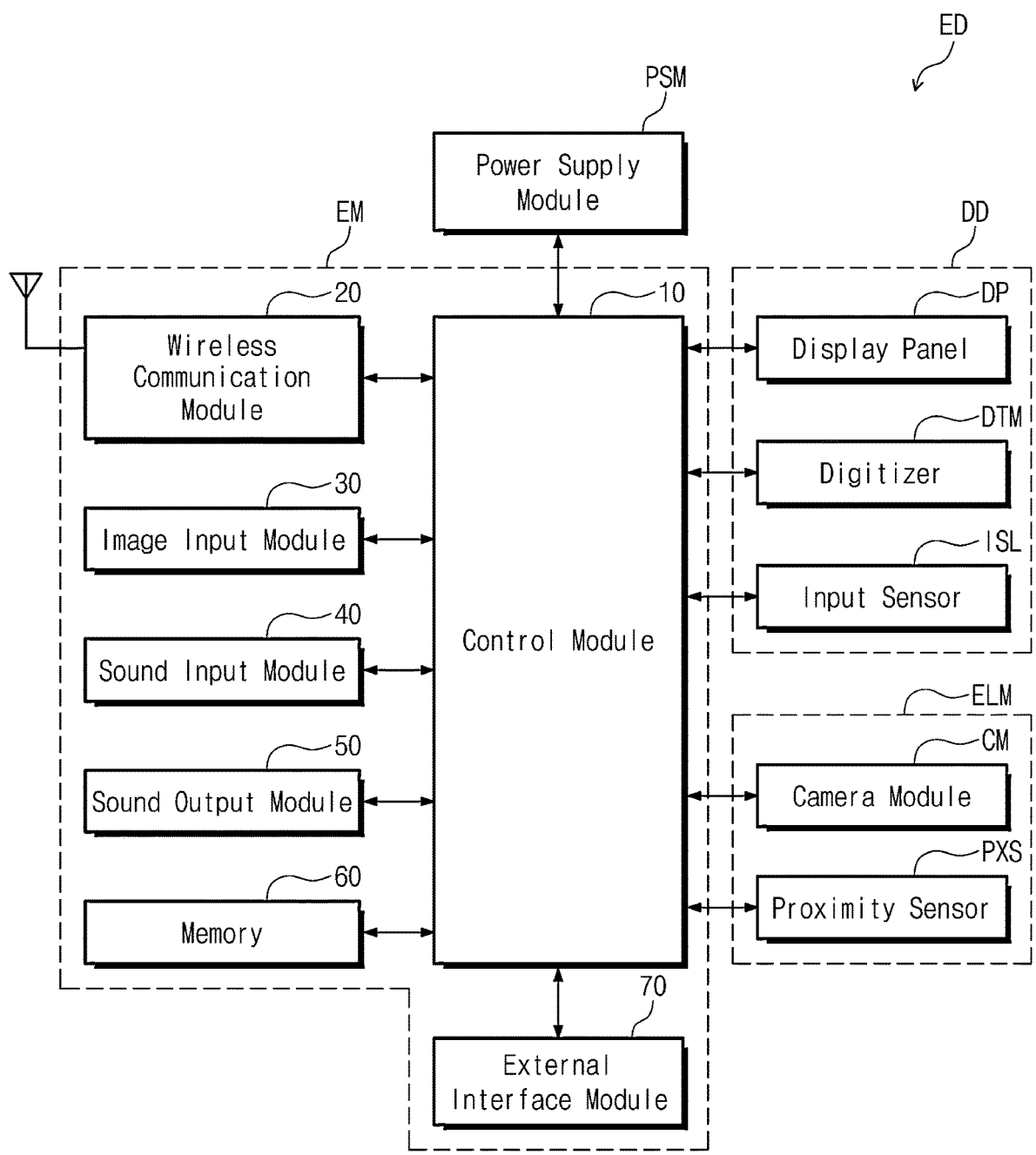
FIG. 2B is a block diagram of the electronic device according to an embodiment of the disclosure.

FIG. 2A is an exploded perspective view of the electronic device ED according to an embodiment of the disclosure. FIG. 2B is a block diagram of the electronic device ED according to an embodiment of the disclosure.

In an embodiment, as illustrated in FIGS. 2A and 2B, the electronic device ED may include a display device DD, electronic modules EM, an electro-optical module ELM, power supply modules PSM, and a housing HM. Although not separately illustrated, an embodiment of the electronic device ED may further include a mechanical structure for controlling a folding motion of the display device DD.

The display device DD generates an image and senses an external input. The display device DD includes a window WM and a display module DM. The window WM provides the front side of the electronic device ED. The window WM will be described later in greater detail.

The display module DM may include at least a display panel DP. Although FIG. 2A illustrates only the display panel DP among a stacked structure of the display module DM for convenience of illustration, the display module DM may substantially further include a plurality of components disposed over the display panel DP. The stack structure of the display module DM will be described later in greater detail.

The display panel DP is not particularly limited and may be, for example, an emissive display panel such as an organic light emitting display panel or a quantum dot light emitting display panel.

The display panel DP may include a display area DP-DA and a non-display area DP-NDA that correspond to the display area DA (refer to FIG. 1A) and the non-display area NDA (refer to FIG. 1A) of the electronic device ED. The expression "an area/portion corresponds to another area/portion" used herein means that the areas/portions overlap each other and is not limited to the meaning of having the same area.

The display panel DP may include a sensing area DP-TA corresponding to the sensing area TA of FIG. 1A. The sensing area DP-TA may have a lower resolution than the display area DP-DA. The sensing area DP-TA will be described later in greater detail.

In an embodiment, as illustrated in FIG. 2A, a driving chip DIC may be disposed on the non-display area DP-NDA of the display panel DP. A flexible circuit film FCB may be coupled to the non-display area DP-NDA of the display panel DP. The flexible circuit film FCB may be connected to a main circuit board. The main circuit board may be one electronic component constituting the electronic modules EM.

The driving chip DIC may include drive elements (e.g., a data drive circuit) for driving pixels of the display panel DP. Although FIG. 2A illustrates the structure in which the driving chip DIC is mounted on the display panel DP, the disclosure is not limited thereto. In an embodiment, for example, the driving chip DIC may be mounted on the flexible circuit film FCB.

In an embodiment, as illustrated in FIG. 2B, the display device DD may further include an input sensor ISL and a digitizer DTM. The input sensor ISL senses an input of the user. The input sensor ISL of a capacitive type may be disposed over the display panel DP. The digitizer DTM senses an input of a stylus pen. The digitizer DTM of an electromagnetic induction type may be disposed under the display panel DP.

In an embodiment, the electronic modules EM may include a control module 10, a wireless communication module 20, an image input module 30, a sound input module 40, a sound output module 50, a memory 60, an external interface module 70, and the like. The electronic modules EM may include the main circuit board, and the modules may be mounted on the main circuit board, or may be electrically connected to the main circuit board through flexible circuit boards. The electronic modules EM are electrically connected with the power supply modules PSM.

The housing HM illustrated in FIG. 2A is coupled with the display device DD, particularly, the window WM and accommodates the other modules. In an embodiment, as shown in FIG. 2A, the housing HM may include first and second housings HM1 and HM2 separated from each other, but the housing HM is not limited thereto. Although not illustrated, the electronic device ED may further include a hinge structure for connecting the first and second housings HM1 and HM2.

Referring to FIGS. 2A and 2B, an embodiment of the electronic modules EM may be disposed in the first housing HM1 and the second housing HM2, respectively, and the power supply modules PSM may be disposed in the first housing HM1 and the second housing HM2, respectively. Although not illustrated, the electronic module EM disposed in the first housing HM1 and the electronic module EM disposed in the second housing HM2 may be electrically connected with each other through a connecting film.

The control module 10 controls overall operation of the electronic device ED. In an embodiment, for example, the control module 10 activates or deactivates the display device DD in response to a user input. The control module 10 may control the image input module 30, the sound input module 40, and the sound output module 50 in response to user inputs. The control module 10 may include at least one microprocessor.

The wireless communication module 20 may transmit/receive wireless signals with another terminal through Bluetooth® or Wi-Fi®. The wireless communication module 20 may transmit/receive sound signals using a general communication line. The wireless communication module 20 may include a plurality of antenna modules.

The image input module 30 processes an image signal to covert the image signal into image data that can be displayed on the display device DD. In a voice recording mode or a voice recognition mode, the sound input module 40 receives an external sound signal through a microphone and converts the external sound signal into electrical voice data. The sound output module 50 converts sound data received from the wireless communication module 20 or sound data stored in the memory 60 and outputs the converted data to the outside.

The external interface module 70 serves as an interface connected to an external charger, a wired/wireless data port, a card socket (e.g., a memory card or a SIM/UIM card), or the like.

The power supply modules PSM supply power used for overall operation of the electronic device ED. The power supply modules PSM may include a conventional battery device.

The electro-optical module ELM may be an electronic component that outputs or receives an optical signal. The electro-optical module ELM may include a camera module CM and/or a proximity sensor PXS. The camera module CM takes an image of an external object through the sensing area DP-TA.

Figure 3A:
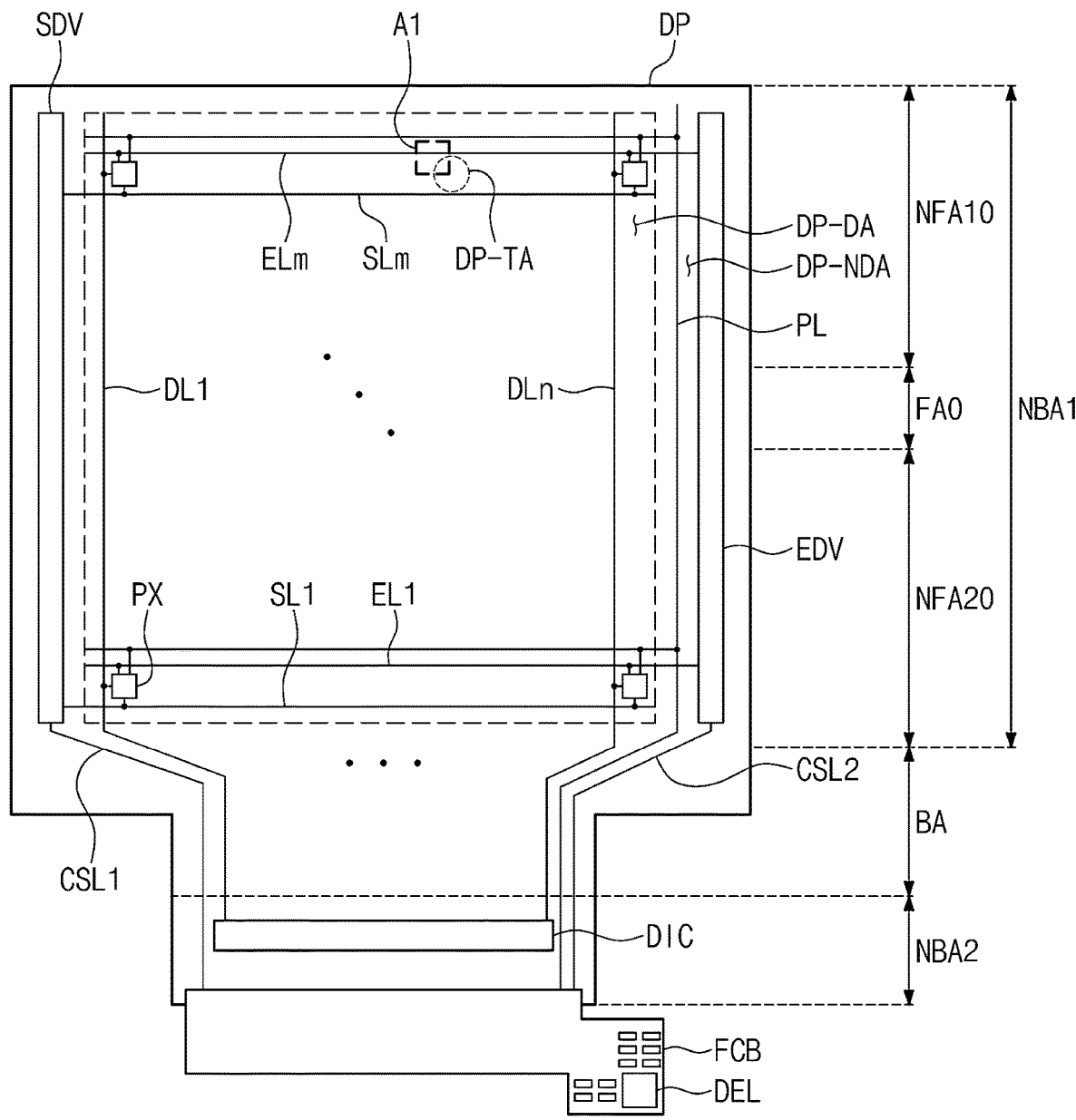
FIG. 3A is a plan view of a display panel according to an embodiment of the disclosure.

FIG. 3A is a plan view of the display panel DP according to an embodiment of the disclosure. FIG. 3B is an enlarged plan view of a partial area A1 in FIG. 3A.

Referring to FIG. 3A, an embodiment of the display panel DP may include the display area DP-DA and the non-display area DP-NDA around the display area DP-DA. The display area DP-DA and the non-display area DP-NDA may be distinguished from each other depending on a presence or absence of pixels PX. The pixels PX are disposed in the display area DP-DA. A scan driver SDV, a data driver, and an emission driver EDV may be disposed in the non-display area DP-NDA. The data driver may be a circuit included in the driving chip DIC illustrated in FIG. 2A.

The display panel DP includes a first area NBA1, a second area NBA2, and a bending area BA distinguished from one another or sequentially defined in the second direction DR2. The second area NBA2 and the bending area BA may be partial areas of the non-display area DP-NDA. The bending area BA is disposed between the first area NBA1 and the second area NBA2. The bending area BA may be bent with respect to a bending axis parallel to the first direction DR1, and the first and second areas NBA1 and NBA2 may be non-bending (or flat) areas.

The first area NBA1 corresponds to the display surface DS of FIG. 1A. The first area NBA1 may include a first non-folding area NFA10, a second non-folding area NFA20, and a folding area FAO. The first non-folding area NFA10, the second non-folding area NFA20, and the folding area FAO correspond to the first non-folding area NFA1, the second non-folding area NFA2, and the folding area FA of FIGS. 1A to 1C, respectively.

The lengths of the bending area BA and the second area NBA2 in the first direction DR1 may be smaller than or equal to the length of the first area NBA1 in the first direction DR1. An area having a small length in the direction of the bending axis may be more easily bent.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, and a power line PL. Here, "m" and "n" are natural numbers. The pixels PX may be connected to the scan lines SL1 to SLm, the data lines DL1 to DLn, and the emission lines EL1 to ELm.

The scan lines SL1 to SLm may extend in the first direction DR1 and may be connected to the scan driver SDV. The data lines DL1 to DLn may extend in the second direction DR2 and may be connected to the driving chip DIC via the bending area BA. The driving chip DIC may be mounted on the second area NBA2. The emission lines EL1 to ELm may extend in the first direction DR1 and may be connected to the emission driver EDV.

The power line PL may include a portion extending in the second portion DR2 and a portion extending in the first direction DR1. The portion extending in the first direction DR1 and the portion extending in the second portion DR2 may be disposed in different layers from each other. The portion of the power line PL that extends in the second direction DR2 may extend to the second area NBA2 via the bending area BA. The power line PL may provide a first voltage to the pixels PL.

The first control line CSL1 may be connected to the scan driver SDV and may extend toward a lower end of the second area NBA2 via the bending area BA. The second control line CSL2 may be connected to the emission driver EDV and may extend toward the lower end of the second area NBA2 via the bending area BA.

The flexible circuit film FCB may be coupled to the lower end of the second area NBA2. The flexible circuit film FCB may be electrically connected to the display panel DP through an anisotropic conductive adhesive layer. Various drive elements DEL provided to drive the display panel DP and the driving chip DIC may be mounted on the flexible circuit film FCB. The drive elements DEL may further include elements for driving the input sensor ISL (refer to FIG. 2B).

Referring to FIG. 3B, the sensing area DP-TA may have a higher light transmittance and a lower resolution than the display area DP-DA. The light transmittance and the resolution are measured in a reference area. The percentage of a light blocking structure in the reference area may be lower in the sensing area DP-TA than in the display area DP-DA. The light blocking structure may include a conductive pattern of a circuit layer, an electrode of a light emitting element, a light blocking pattern, and the like that will be described below.

The resolution in the reference area may be lower in the sensing area DP-TA than in the display area DP-DA. The number of pixels disposed in the reference area (or, the same area) is smaller in the sensing area DP-TA than in the display area DP-DA.

As illustrated in FIG. 3B, a first pixel PX1 may be disposed in the display area DP-DA, and a second pixel PX2 may be disposed in the sensing area DP-TA. The first pixel PX1 and the second pixel PX2 may have different light emitting areas when the areas of pixels of a same color are compared with each other. The first pixel PX1 and the second pixel PX2 may have different arrangement structures.

In an embodiment, as shown in FIG. 3B, emissive areas LA of the first pixel PX1 and the second pixel PX2 are illustrated on behalf of the first pixel PX1 and the second pixel PX2. Each of the emissive areas LA may be defined as an area where an anode of a light emitting element is exposed from a pixel defining film. A non-emissive area NLA is disposed between the emissive areas LA in the display area DP-DA.

The first pixel PX1 may include a first color pixel PX1-R, a second color pixel PX1-G, and a third color pixel PX1-B, and the second pixel PX2 may include a first color pixel PX2-R, a second color pixel PX2-G, and a third color pixel PX2-B. The first color pixels PX1-R and PX2-R may be red pixels, the second color pixels PX1-G and PX2-G may be green pixels, and the third color pixels PX1-B and PX2-B may be blue pixels.

The sensing area DP-TA may include a pixel area PA, a wiring area BL, and a transmissive area BT. The second pixel PX2 is disposed in the pixel area PA. In an embodiment, as shown in FIG. 3B, two first color pixels PX2-R, four second color pixels PX2-G, and two third color pixels PX2-B may be disposed in one pixel area PA, but the disclosure is not limited thereto.

A conductive pattern, a signal line, or a light blocking pattern associated with the second pixel PX2 is disposed in the pixel area PA and the wiring area BL. The light blocking pattern may be a metal pattern and may substantially overlap the pixel area PA and the wiring area BL. The pixel area PA and the wiring area BL may be non-transmissive areas through which an optical signal cannot substantially pass.

The transmissive area BT is an area through which an optical signal substantially passes. As the second pixel PX2 is not disposed in the transmissive area BT, a conductive pattern, a signal line, or a light blocking pattern is disposed in the transmissive area BT. Accordingly, the transmissive area BT increases the light transmittance of the sensing area DP-TA.

Figure 4:
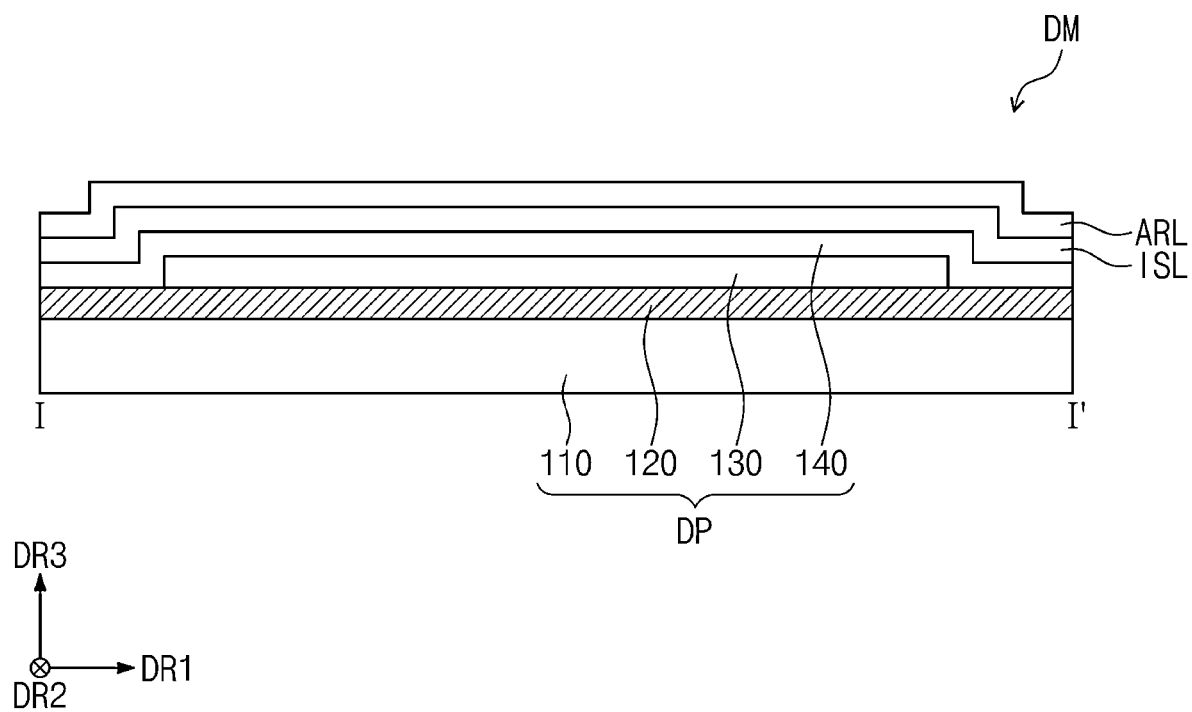
FIG. 4 is a sectional view of a display module taken along line I-I' illustrated in FIG. 2A.

FIG. 4 is a sectional view of the display module DM according to an embodiment of the disclosure.

Referring to FIG. 4, an embodiment of the display module DM may include the display panel DP, the input sensor ISL, and an anti-reflection layer ARL. The display panel DP may include a base layer 110, a circuit layer 120, a light emitting element layer 130, and an encapsulation layer 140.

The base layer 110 may provide a base surface on which the circuit layer 120 is disposed. The base layer 110 may be a flexible substrate that may be bent, folded, or rolled. The base layer 110 may be a glass substrate, a metal substrate, a polymer substrate, or the like. Alternatively, without being limited thereto, the base layer 110 may be an inorganic layer, an organic layer, or a composite layer.

The base layer 110 may have a multi-layer structure. In an embodiment, for example, the base layer 110 may include a first synthetic resin layer, an inorganic layer having a multi-layer structure or a single-layer structure, and a second synthetic resin layer disposed on the inorganic layer having the multi-layer structure or the single-layer structure. The first and second synthetic resin layers may each include a polyimide-based resin, but is not particularly limited.

The circuit layer 120 may be disposed on the base layer 110. The circuit layer 120 may include an insulating layer, a semiconductor pattern, a conductive pattern, a signal line, and the like.

The light emitting element layer 130 may be disposed on the circuit layer 120. The light emitting element layer 130 may include light emitting elements. In an embodiment, for example, the light emitting elements may include an organic light emitting material, an inorganic light emitting material, an organic-inorganic light emitting material, a quantum dot, a quantum rod, a micro LED, or a nano-LED.

The encapsulation layer 140 may be disposed on the light emitting element layer 130. The encapsulation layer 140 may protect the light emitting element layer 130 from foreign matter such as moisture, oxygen, and dust particles. The encapsulation layer 140 may include at least one inorganic layer. The encapsulation layer 140 may include a stack structure of an inorganic layer/an organic layer/an inorganic layer.

The input sensor ISL may be directly disposed on the display panel DP. The display panel DP and the input sensor ISL may be formed through a continuous process. When the input sensor ISL is disposed directly on the display panel DP, this may mean that a third component is not disposed between the input sensor ISL and the display panel DP. That is, a separate adhesive layer may not be disposed between the input sensor ISL and the display panel DP.

The anti-reflection layer ARL may be disposed on the input sensor ISL. The anti-reflection layer ARL may decrease the reflectivity of external light incident from outside the display device DD. The anti-reflection layer ARL may include color filters. The color filters may have a predetermined arrangement. In an embodiment, for example, the color filters may be arranged based on emission colors of pixels included in the display panel DP. In an embodiment, the anti-reflection layer ARL may further include a black matrix adjacent to the color filters.

In an embodiment of the disclosure, the positions of the input sensor ISL and the anti-reflection layer ARL may be interchanged with each other. In an embodiment of the disclosure, the anti-reflection layer ARL may be replaced with a polarizer film. The polarizer film may be coupled to the input sensor ISL through an adhesive layer.

Figure 5A:
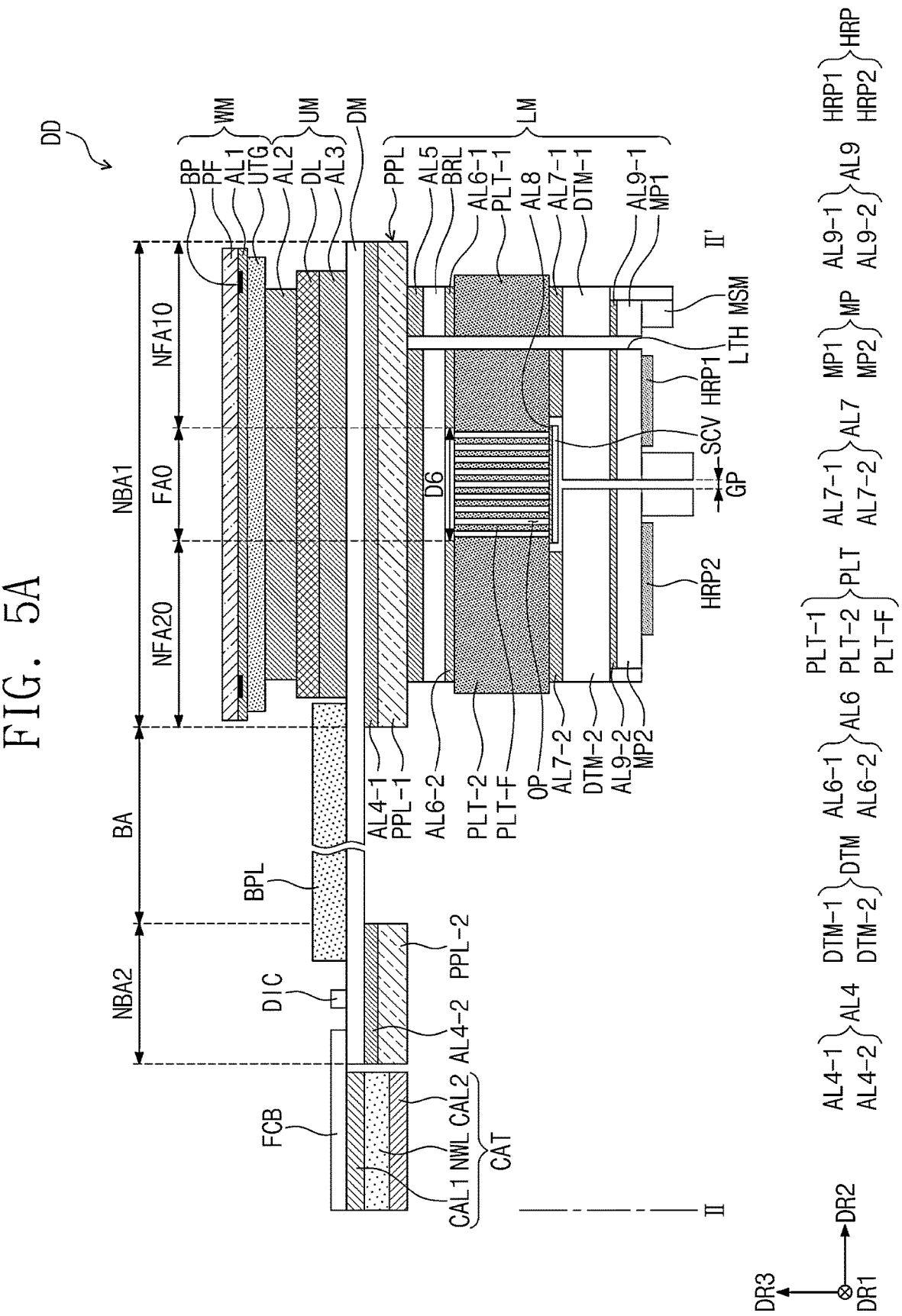
FIG. 5A is a sectional view of a display device taken along line II-IF illustrated in FIG. 2A.
Figure 5B:
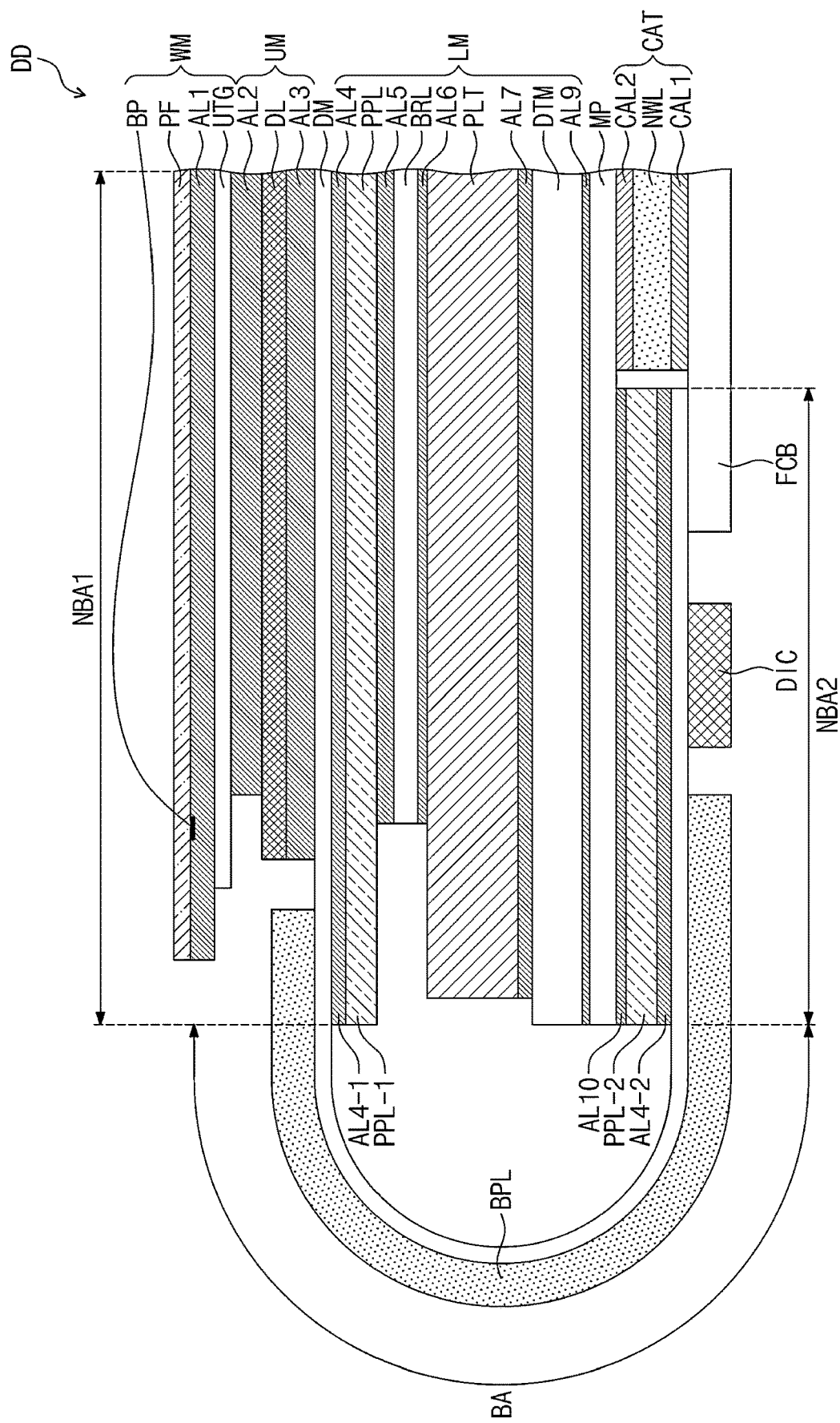
FIG. 5B is a sectional view illustrating a bent state of the display module according to an embodiment of the disclosure.

FIG. 5A is a sectional view of the display device DD taken along line II-II' illustrated in FIG. 2A. FIG. 5B is a sectional view illustrating a bent state of the display module DM according to an embodiment of the disclosure.

FIG. 5A illustrates an embodiment of the display device DD in a flat state in which the display module DM is not bent. FIG. 5B illustrates an embodiment of the display device DD in a state in which the bending area BA (refer to FIG. 3A) of the display module DM is bent. In FIGS. 5A and 5B, areas of the display module DM are illustrated based on the areas of the display panel DP of FIG. 3A.

Referring to FIGS. 5A and 5B, an embodiment of the display device DD includes the window WM, an upper module UM, the display module DM, and a lower module LM. Components disposed between the window WM and the display module DM are collectively referred to as the upper module UM, and components disposed under the display module DM are collectively referred to as the lower module LM.

The window WM may include a thin glass substrate UTG, a window protection layer PF disposed over the thin glass substrate UTG, and a bezel pattern BP disposed on the lower surface of the window protection layer PF. In an embodiment, the window protection layer PF may include a synthetic resin film. The window WM may further include an adhesive layer AL1 (hereinafter, referred to as the first adhesive layer) that couples the window protection layer PF and the thin glass substrate UTG to each other.

The bezel pattern BP overlaps the non-display area NDA illustrated in FIG. 1A. The bezel pattern BP may be disposed on one surface of the thin glass substrate UTG or one surface of the window protection layer PF. FIG. 5B illustrates an embodiment where the bezel pattern BP is disposed on the lower surface of the window protection layer PF. Alternatively, without being limited thereto, the bezel pattern BP may be disposed on the upper surface of the window protection layer PF. The bezel pattern BP may be a colored light-blocking film and may be formed by, for example, a coating method. The bezel pattern BP may include a base material and a dye or a pigment mixed with the base material.

The thin glass substrate UTG may have a thickness in a range of about 15 micrometers (μm) to about 45 μm. The thin glass substrate UTG may be a chemically strengthened glass substrate. The occurrence of a fold in the thin glass substrate UTG may be minimized even though the thin glass substrate UTG is repeatedly folded and unfolded.

The window protection layer PF may have a thickness in a range of about 50 μm to about 80 μm. The synthetic resin film of the window protection layer PF may include polyimide, polycarbonate, polyamide, triacetylcellulose, polymethylmethacrylate, or polyethylene terephthalate. Although not separately illustrated, at least one selected from a hard coating layer, an anti-fingerprint layer, and an anti-reflection layer may be disposed on the upper surface of the window protection layer PF.

The first adhesive layer AL1 may be a pressure sensitive adhesive ("PSA") film or an optically clear adhesive ("OCA") member. Adhesive layers to be described below may also include a same adhesive as the first adhesive layer AL1.

The first adhesive layer AL1 may be separated from the thin glass substrate UTG. The window protection layer PF may be relatively easily scratched because the window protection layer PF has a lower strength than the thin glass substrate UTG. In an embodiment, the window protection layer PF may be replaceable or replaced by attaching a new window protection layer PF to the thin glass substrate UTG after separating the first adhesive layer AL1 and the window protection layer PF from each other.

In an embodiment, the edge of the thin glass substrate UTG may not overlap the bezel pattern BP on the plane, or when viewed from a plan view in the third direction DR3. In such an embodiment, the edge of the thin glass substrate UTG may be exposed by not being covered by the bezel pattern BP, and micro cracks that may be generated at the edge of the thin glass substrate UTG may be effectively examined or detected through an inspection device.

The upper module UM includes an upper film DL. The upper film DL may include a synthetic resin film. The synthetic resin film may include polyimide, polycarbonate, polyamide, triacetylcellulose, polymethylmethacrylate, or polyethylene terephthalate.

The upper film DL may absorb an external impact applied to the front side of the display device DD. In an embodiment, as described with reference to FIG. 4, the display module DM may include the anti-reflection layer ARL that replaces a polarizer film, and therefore the impact strength of the front side of the display device DD may be decreased. The upper film DL may compensate for the impact strength of the display device DD that is decreased by the application of the anti-reflection layer ARL. In an embodiment of the disclosure, the upper film DL may be omitted. In an embodiment, the upper module UM may further include a second adhesive layer AL2 that couples the upper film DL and the window WM to each other and a third adhesive layer AL3 that couples the upper film DL and the display module DM to each other.

The lower module LM may include a panel protection layer PPL, a barrier layer BRL, a support layer PLT, a cover layer SCV, a digitizer DTM, a support plate MP, a heat radiating layer HRP, and fourth to ninth adhesive layers AL4 to AL9. The fourth to ninth adhesive layers AL4 to AL9 may include an adhesive such as a PSA or an OCA. In an embodiment of the disclosure, some of the aforementioned components may be omitted. In an embodiment, for example, the digitizer DTM or the heat radiating layer HRP and adhesive layers related thereto may be omitted.

The panel protection layer PPL may be disposed under the display module DM. The panel protection layer PPL may protect the bottom of the display module DM. The panel protection layer PPL may include a flexible synthetic resin film. In an embodiment, for example, the panel protection layer PPL may include polyethylene terephthalate.

In an embodiment of the disclosure, the panel protection layer PPL may not be disposed in the bending area BA. The panel protection layer PPL may include a first panel protection layer PPL-1 that protects the first area NBA1 of the display panel DP (refer to FIG. 3A) and a second panel protection layer PPL-2 that protects the second area NBA2.

The fourth adhesive layer AL4 couples the panel protection layer PPL and the display panel DP. The fourth adhesive layer AL4 may include a first portion AL4-1 corresponding to the first panel protection layer PPL-1 and a second portion AL4-2 corresponding to the second panel protection layer PPL-2.

In an embodiment, as illustrated in FIG. 5B, the second panel protection layer PPL-2, together with the second area NBA2, may be disposed under the first area NBA1 and the first panel protection layer PPL-1 when the bending area BA is bent. The bending area BA may be more easily bent because the panel protection layer PPL is not disposed in the bending area BA. The second panel protection layer PPL-2 may be attached to the support plate MP through a tenth adhesive layer AL10. Alternatively, the tenth adhesive layer AL10 may be omitted. Although not separately illustrated, an additional component such as an insulating tape may be further disposed between the second panel protection layer PPL-2 and the support plate MP.

In an embodiment, as illustrated in FIG. 5B, the bending area BA has a predetermined curvature or a predetermined radius of curvature. The radius of curvature of the bending area BA in a bent state may be in a range of about 0.1 millimeter (mm) to about 0.5 mm. A bending protection layer BPL is disposed in at least the bending area BA. The bending protection layer BPL may overlap the bending area BA, the first area NBA1, and the second area NBA2. The bending protection layer BPL may be disposed on a portion of the first area NBA1 and a portion of the second area NBA2.

The bending protection layer BPL may be bent together with the bending area BA. The bending protection layer BPL protects the bending area BA from an external impact and controls the neutral plane of the bending area BA. The bending protection layer BPL controls stress of the bending area BA in a way such that the neutral plane approaches signal lines disposed in the bending area BA.

In an embodiment, as illustrated in FIGS. 5A and 5B, the fifth adhesive layer AL5 couples the panel protection layer PPL and the barrier layer BRL to each other. The barrier layer BRL may be disposed under the panel protection layer PPL. The barrier layer BRL may increase resistance to a compressive force caused by external pressing. Accordingly, the barrier layer BRL may serve to prevent deformation of the display module DM. The barrier layer BRL may include a flexible plastic material such as polyimide or polyethylene terephthalate. In an embodiment, the barrier layer BRL may be a colored film having a low light transmittance. The barrier layer BRL may absorb light incident from the outside. In an embodiment, for example, the barrier layer BRL may be a black synthetic resin film. Components disposed under the barrier layer BRL may not be visible to the user when the display device DD is viewed from above the window protection layer PF.

The sixth adhesive layer AL6 couples the barrier layer BRL and the support layer PLT to each other. The sixth adhesive layer AL6 may include a first portion AL6-1 and a second portion AL6-2 spaced apart from each other. The separation distance D6 (or, the gap) between the first portion AL6-1 and the second portion AL6-2 corresponds to the width of the folding area FAO and is greater than a gap GP to be described below. The separation distance D6 between the first portion AL6-1 and the second portion AL6-2 may be in a range of about 7 mm to about 15 mm, e.g., in a range of about 9 mm to about 13 mm.

In such an embodiment, the first portion AL6-1 and the second portion AL6-2 may be defined by different portions of a single adhesive layer. However, the disclosure is not limited thereto. In an embodiment where the first portion AL6-1 is defined by one adhesive layer (e.g., a first adhesive layer or a second adhesive layer), the second portion AL6-2 may be defined by another adhesive layer (e.g., the second adhesive layer or a third adhesive layer). The above-described definition may be applied not only to the sixth adhesive layer AL6 but also to adhesive layers including two portions among adhesive layers to be described below.

The support layer PLT is disposed under the barrier layer BRL. The support layer PLT supports components disposed over the support layer PLT and maintains a flat state and a folded state of the display device DD. The support layer PLT has a greater strength than the barrier layer BRL. The support layer PLT includes at least a first support portion PLT-1 corresponding to the first non-folding area NFA10 and a second support portion PLT-2 corresponding to the second non-folding area NFA20. The first support portion PLT-1 and the second support portion PLT-2 are spaced apart from each other in the second direction DR2.

In such an embodiment, the support layer PLT may include a folding portion PLT-F that corresponds to the folding area FAO and is disposed between the first support portion PLT-1 and the second support portion PLT-2. In an embodiment, a plurality of openings OP may be defined in the folding portion PLT-F. The plurality of openings OP may be arranged in a way such that the folding portion PLT-F has a grid shape on the plane. The first support portion PLT-1, the second support portion PLT-2, and the folding portion PLT-F may have an integrated shape or integrally formed with each other as a single unitary unit.

The folding portion PLT-F may prevent or reduce infiltration of foreign matter into a central area of the barrier layer BRL in the folding motions illustrated in FIGS. 1B and 1C. In an embodiment, the flexibility of the folding portion PLT-F is improved by the plurality of openings OP. In an embodiment, the flexibility of the support layer PLT may be improved because the sixth adhesive layer AL6 is not disposed on the folding portion PLT-F. In an alternative embodiment of the disclosure, the folding portion PLT-F may be omitted. In such an embodiment, the support layer PLT includes only the first support portion PLT-1 and the second support portion PLT-2 spaced apart from each other.

The support layer PLT may be selected from materials capable of transmitting an electromagnetic field generated from the digitizer DTM, which will be described below, without loss or with minimal loss. The support layer PLT may include a non-metallic material. The support layer PLT may include a fiber reinforced composite. The support layer PLT may include reinforced fibers disposed inside a matrix part. The reinforced fibers may be carbon fibers or glass fibers. The matrix part may include a polymer resin. The matrix part may include a thermoplastic resin. In an embodiment, for example, the matrix part may include a polyamide-based resin or a polypropylene-based resin. In an embodiment, for example, the fiber reinforced composite may be carbon fiber reinforced plastic ("CFRP") or glass fiber reinforced plastic ("GFRP").

The cover layer SCV and the digitizer DTM are disposed under the support layer PLT. The cover layer SCV is disposed to overlap the folding area FAO. The digitizer DTM may include a first digitizer DTM-1 and a second digitizer DTM-2 that overlap the first support portion PLT-1 and the second support portion PLT-2, respectively. A portion of each of the first digitizer DTM-1 and the second digitizer DTM-2 may be disposed under the cover layer SCV.

The seventh adhesive layer AL7 couples the support layer PLT and the digitizer DTM to each other, and the eighth adhesive layer AL8 couples the cover layer SCV and the support layer PLT to each other. The seventh adhesive layer AL7 may include a first portion AL7-1 that couples the first support portion PLT-1 and the first digitizer DTM-1 to each other and a second portion AL7-2 that couples the second support portion PLT-2 and the second digitizer DTM-2 to each other.

The cover layer SCV may be disposed between the first portion AL7-1 and the second portion AL7-2 in the second direction DR2. The cover layer SCV may be spaced apart from the digitizer DTM to prevent interference with the digitizer DTM in a flat state. The sum of the thickness of the cover layer SCV and the thickness of the eighth adhesive layer AL8 may be smaller than the thickness of the seventh adhesive layer AL7.

The cover layer SCV may cover the openings OP of the folding portion PLT-F. The cover layer SCV may have a lower elastic modulus than the support layer PLT. In an embodiment, for example, the cover layer SCV may include thermoplastic poly-urethane, rubber, or silicone, but is not limited thereto.

The digitizer DTM, also called an electromagnetic resonance ("EMR") sensing panel, includes a plurality of loop coils that generate a magnetic field of a preset resonant frequency with an electronic pen. The magnetic field generated by the loop coils is applied to an LC resonance circuit of the electronic pen that includes an inductor (coil) and a capacitor. The coil generates a current by the received magnetic field and transfers the generated current to the capacitor. The capacitor charges the current input from the coil and discharges the charged current to the coil. Accordingly, a magnetic field of a resonant frequency is emitted to the coil. The magnetic field emitted by the electronic pen may be absorbed by the loop coils of the digitizer DTM again, and thus the position of the electronic pen on the touch screen may be determined.

The first digitizer DTM-1 and the second digitizer DTM-2 may be spaced apart from each other by the predetermined gap GP. The gap GP may be in a range of about 0.3 mm to about 3 mm and may be located to correspond to the folding area FAO. The digitizer DTM will be described later in greater detail.

The support plate MP is disposed under the digitizer DTM. The support plate MP may include a first sub-plate MP1 and a second sub-plate MP2 that overlap the first digitizer DTM1 and the second digitizer DTM2, respectively. The support plate MP may absorb an external impact applied from below. The support plate MP may include a metallic material such as stainless steel.

The ninth adhesive layer AL9 couples the digitizer DTM and the support plate MP to each other. The ninth adhesive layer AL9 may include a first portion AL9-1 and a second portion AL9-2 that correspond to the first sub-plate MP1 and the second sub-plate MP2, respectively.

The heat radiating layer HRP may be disposed under the support plate MP. The heat radiating layer HRP may include a first heat radiating layer HRP1 and a second heat radiating layer HRP2 that overlap the first sub-plate MP1 and the second sub-plate MP2, respectively. The heat radiating layer HRP radiates heat generated from electronic components disposed under the heat radiating layer HRP. The electronic components may be the electronic modules EM illustrated in FIGS. 2A and 2B. The heat radiating layer HRP may have a structure in which adhesive layers and graphite layers are alternately stacked one on another. The outermost adhesive layer may be attached to the support plate MP.

A magnetic-field shielding sheet MSM is disposed under the support plate MP. The magnetic-field shielding sheet MSM shields a magnetic field generated from a magnetic material (not illustrated) that is disposed under the magnetic-field shielding sheet MSM. The magnetic-field shielding sheet MSM may prevent the magnetic field generated from the magnetic material from interfering with the digitizer DTM.

The magnetic-field shielding sheet MSM includes a plurality of shielding portions. At least some of the plurality of shielding portions may have different thicknesses from each other. The plurality of shielding portions may be disposed to match steps of a bracket (not illustrated) that is located on a lower side of the display device DD. The magnetic-field shielding sheet MSM may have a structure in which magnetic-field shielding layers and adhesive layers are alternately stacked one on another. A portion of the magnetic-field shielding sheet MSM may be attached directly to the first sub-plate MP1, and a portion of the magnetic-field shielding sheet MSM may be attached directly to the second sub-plate MP2.

A through-hole LTH may be defined or formed through some members of the lower module LM. The through-hole LTH is disposed to overlap the sensing area DP-TA of FIG. 2A. In an embodiment, as illustrated in FIG. 5A, the through-hole LTH may be defined through layers from the fifth adhesive layer AL5 to the support plate MP. The through-hole LTH may correspond to a state in which a light blocking structure is removed on the path of an optical signal. The through-hole LTH may improve efficiency in receiving an optical signal by the electro-optical module ELM.

A conductive adhesive tape CAT may be disposed on the rear surface of the flexible circuit film FCB. In an embodiment, as illustrated in FIG. 5B, the conductive adhesive tape CAT may be disposed between the flexible circuit film FCB and the support plate MP in the state in which the display module DM is bent. In an embodiment of the disclosure, the conductive adhesive tape CAT may be a double-sided adhesive tape. Accordingly, the flexible circuit film FCB may be fixed to the rear surface of the support plate MP by the conductive adhesive tape CAT. The conductive adhesive tape CAT may serve to compensate for a step formed on the rear surface of the support plate MP by the second panel protection layer PPL-2. In an embodiment, the conductive adhesive tape CAT may have a thickness sufficient to compensate for the step.

In an embodiment, the conductive adhesive tape CAT may include a conductive nonwoven fabric layer NWL, a first conductive adhesive layer CAL1, and a second conductive adhesive layer CAL2. The conductive nonwoven fabric layer NWL may be disposed between the first conductive adhesive layer CAL1 and the second conductive adhesive layer CAL2. The conductive nonwoven fabric layer NWL may have a structure in which a nonwoven fabric material is plated with a metallic material such as copper or nickel. In an embodiment of the disclosure, the conductive nonwoven fabric layer NWL may be a nonwoven fabric layer on which a cire process is not performed and may have a lower smoothness and a higher void fraction than a nonwoven fabric layer on which a cire process is performed.

The first conductive adhesive layer CAL1 is disposed between the conductive nonwoven fabric layer NWL and the flexible circuit film FCB, and the second conductive adhesive layer CAL2 is disposed between the conductive nonwoven fabric layer NWL and the rear surface of the support plate MP. The first and second conductive adhesive layers CAL1 and CAL2 may include a conductive adhesive material. In an embodiment of the disclosure, each of the first and second conductive adhesive layers CAL1 and CAL2 may be a film formed by dispersing metal particles including gold, silver, platinum, nickel, copper, carbon, or the like in a synthetic resin. The synthetic resin may include a material such as epoxy, silicone, polyimide, polyurethane, or the like.

In an embodiment, the first conductive adhesive layer CAL1 may be electrically connected with a ground wire GNL (refer to FIG. 7B) of the flexible circuit film FCB. The conductive adhesive tape CAT may receive a ground voltage from the flexible circuit film FCB and may transfer the received ground voltage to the support plate MP. In such an embodiment, a static-electricity path formed by electrical connection of the ground wire GNL, the conductive adhesive tape CAT, and the support plate MP may be provided to the display device DD.

Accordingly, in such an embodiment, when static electricity is generated, the static electricity may be discharged through the static-electricity path, and thus the drive elements DEL (refer to FIG. 2A) mounted on the flexible circuit film FCB or the driving chip DIC mounted on the display panel DP may be effectively prevented from being damaged by the static electricity.

Figure 6A:
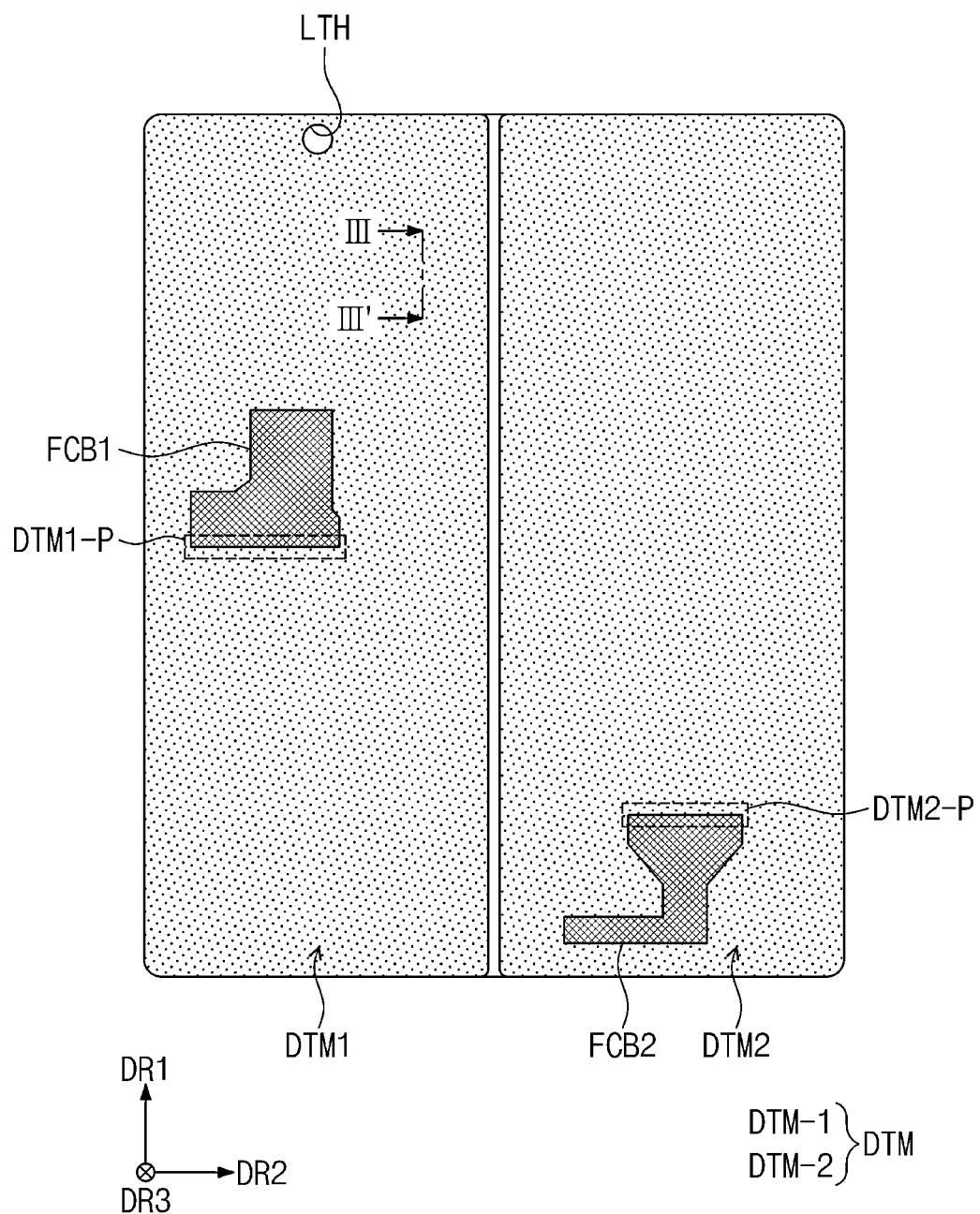
FIG. 6A is a plan view of a digitizer according to an embodiment of the disclosure.

FIG. 6A is a plan view of the digitizer DTM according to an embodiment of the disclosure. FIG. 6B is a sectional view of the digitizer DTM taken along line illustrated in FIG. 6A. FIG. 6A is illustrated based on the state in which the display device DD illustrated in FIG. 5A is inverted.

In an embodiment, as illustrated in FIG. 6A, the digitizer DTM may include the first digitizer DTM-1 and the second digitizer DTM-2 spaced apart from each other. A first flexible circuit film FCB1 and a second flexible circuit film FCB2 may be electrically connected to the first digitizer DTM-1 and the second digitizer DTM-2, respectively. The first flexible circuit film FCB1 and the second flexible circuit film FCB2 may electrically connect the first digitizer DTM-1 and the second digitizer DTM-2 to the main circuit board.

The first digitizer DTM-1 and the second digitizer DTM-2 may include a plurality of first loop coils and a plurality of second loop coils, respectively. The first loop coils may be referred to as the driving coils, and the second loop coils may be referred to as the sensing coils. The plurality of first loop coils and the plurality of second loop coils may be disposed in different layers from each other.

A stack structure of the digitizer DTM will be described based on a section of the first digitizer DTM-1 with reference to FIG. 6B. FIG. 6B illustrates the section of the first digitizer DTM-1 disposed in a same state as the display device DD illustrated in FIG. 5A (that is, in the state in which the display device DD is not inverted). Stack structures of the first digitizer DTM-1 and the second digitizer DTM-2 may be the same as each other.

The first digitizer DTM-1 includes a base layer D-BL, first loop coils 510 disposed on one surface (e.g., an upper surface) of the base layer D-BL, and second loop coils 520 disposed on an opposite surface (e.g., a lower surface) of the base layer D-BL. The base layer D-BL may include a synthetic resin film and may include, for example, a polyimide film. The first loop coils 510 and the second loop coils 520 may include metal and may include gold (Au), silver (Ag), copper (Cu), or aluminum (Al).

A first protective layer PL-D1 for protecting the first loop coils 510 may be disposed over the one surface of the base layer D-BL, and a second protective layer PL-D2 protecting the second loop coils 520 may be disposed under the opposite surface of the base layer D-BL. The first protective layer PL-D1 may be disposed over the first loop coils 510 and may be attached to the one surface of the base layer D-BL through a first adhesive layer AL-D1. The second protective layer PL-D2 may be disposed under the second loop coils 520 and may be attached to the opposite surface of the base layer D-BL through a second adhesive layer AL-D2. Each of the first and second protective layers PL-D1 and PL-D2 may include a synthetic resin film, for example, a polyimide film.

An electromagnetic field generated from the first loop coils 510 or the second loop coils 520 may pass through the support layer PLT because the support layer PLT (refer to FIG. 5A) has insulation or an insulation property as described above. The digitizer DTM disposed under the support layer PLT may sense an external input.

In an embodiment, an electromagnetic shielding layer MML may be disposed under the second protective layer PL-D2. The electromagnetic shielding layer MML may prevent electromagnetic waves generated from the electronic modules EM (refer to FIG. 2A) disposed thereunder from affecting the digitizer DTM as noise.

The electromagnetic shielding layer MML may be attached to the second protective layer PL-D2 through a third adhesive layer AL-D3. The electromagnetic shielding layer MML may include a magnetic metal powder ("MMP") layer. In an alternative embodiment of the disclosure, the electromagnetic shielding layer MML may be omitted.

Referring again to FIG. 6A, an opening corresponding to the through-hole LTH of FIG. 5A may be defined in the first digitizer DTM-1. The first flexible circuit film FCB1 is coupled to a first pad area DTM1-P of the first digitizer DTM-1, and the second flexible circuit film FCB2 is coupled to a second pad area DTM2-P of the second digitizer DTM-2. The first and second flexible circuit films FCB1 and FCB2 may be electrically coupled with the first and second pad areas DTM1-P and DTM2-P through anisotropic conductive adhesive layers, respectively.

The first pad area DTM1-P of the first digitizer DTM-1 may be defined as the area where distal ends of the first loop coils 510 and the second loop coils 520 are arranged or the area where distal ends of signal lines connected to the first loop coils 510 and the second loop coils 520 are arranged. The second pad area DTM2-P of the second digitizer DTM-2 may also be defined as the area where distal ends of the first loop coils 510 and the second loop coils 520 are arranged or the area where distal ends of signal lines connected to the first loop coils 510 and the second loop coils 520 are arranged.

Figure 7A:
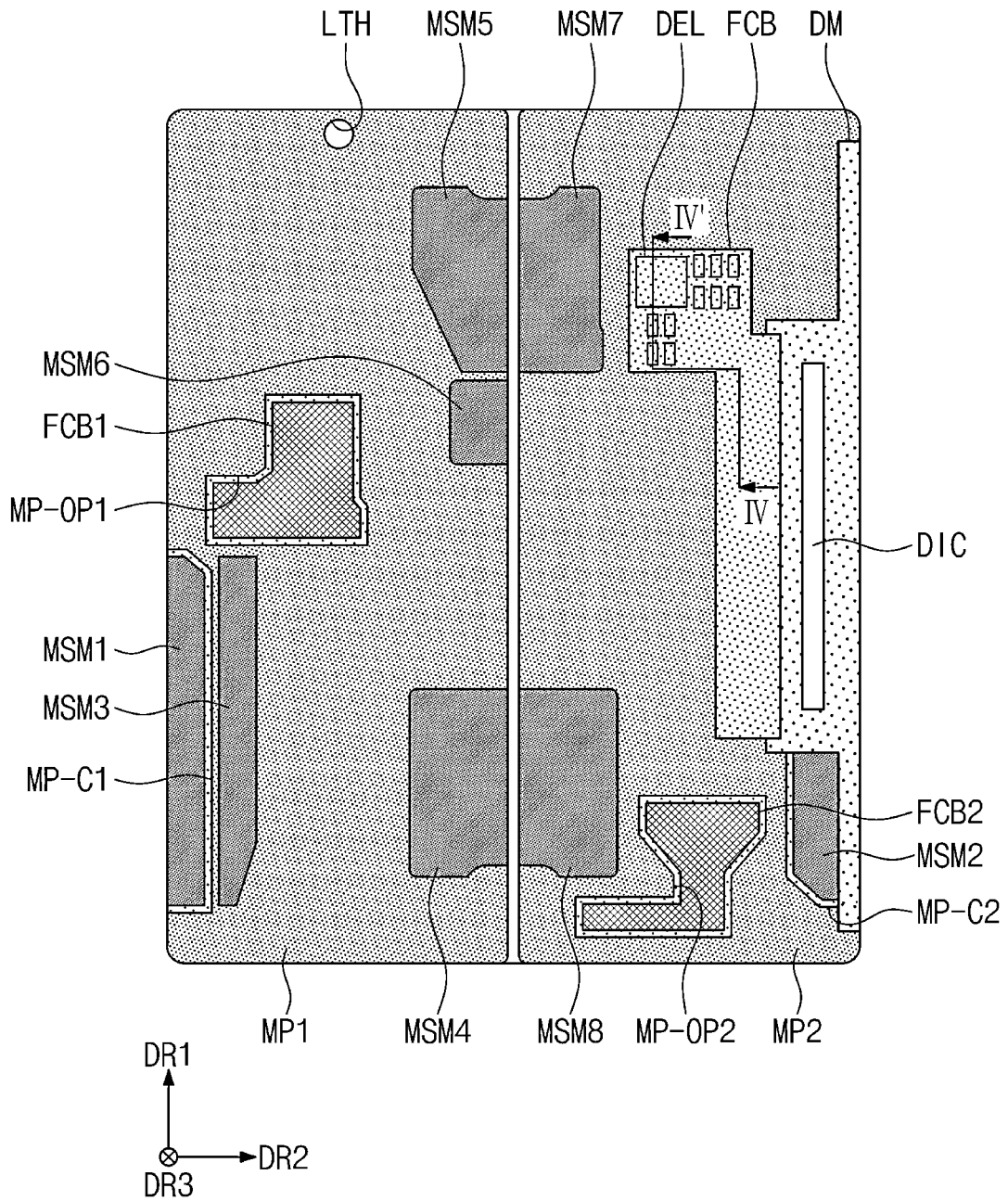
FIG. 7A is a rear view of the display device according to an embodiment of the disclosure.
Figure 7B:
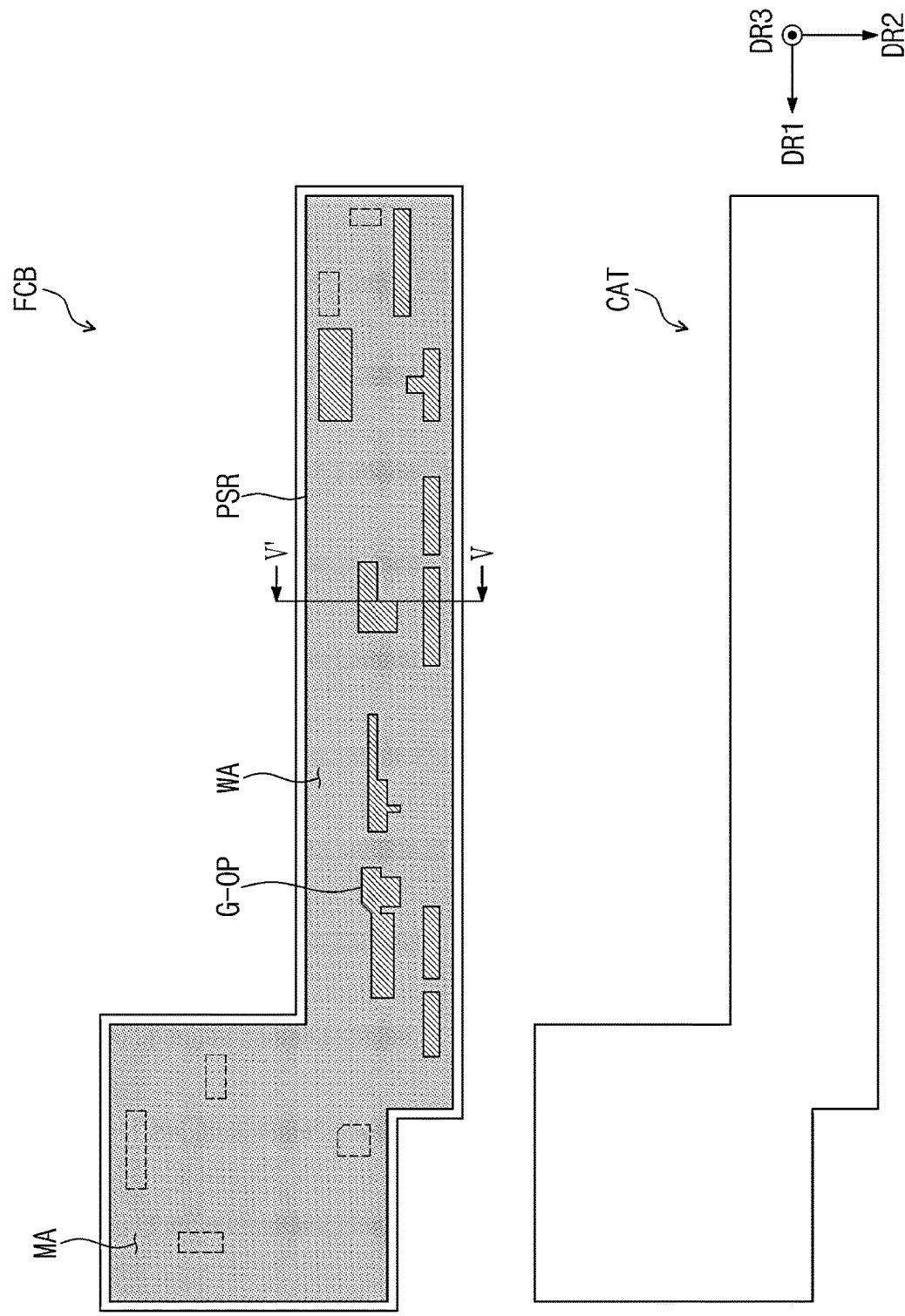
FIG. 7B is a plan view illustrating a flexible circuit film and a conductive adhesive tape according to an embodiment of the disclosure.
Figure 7C:
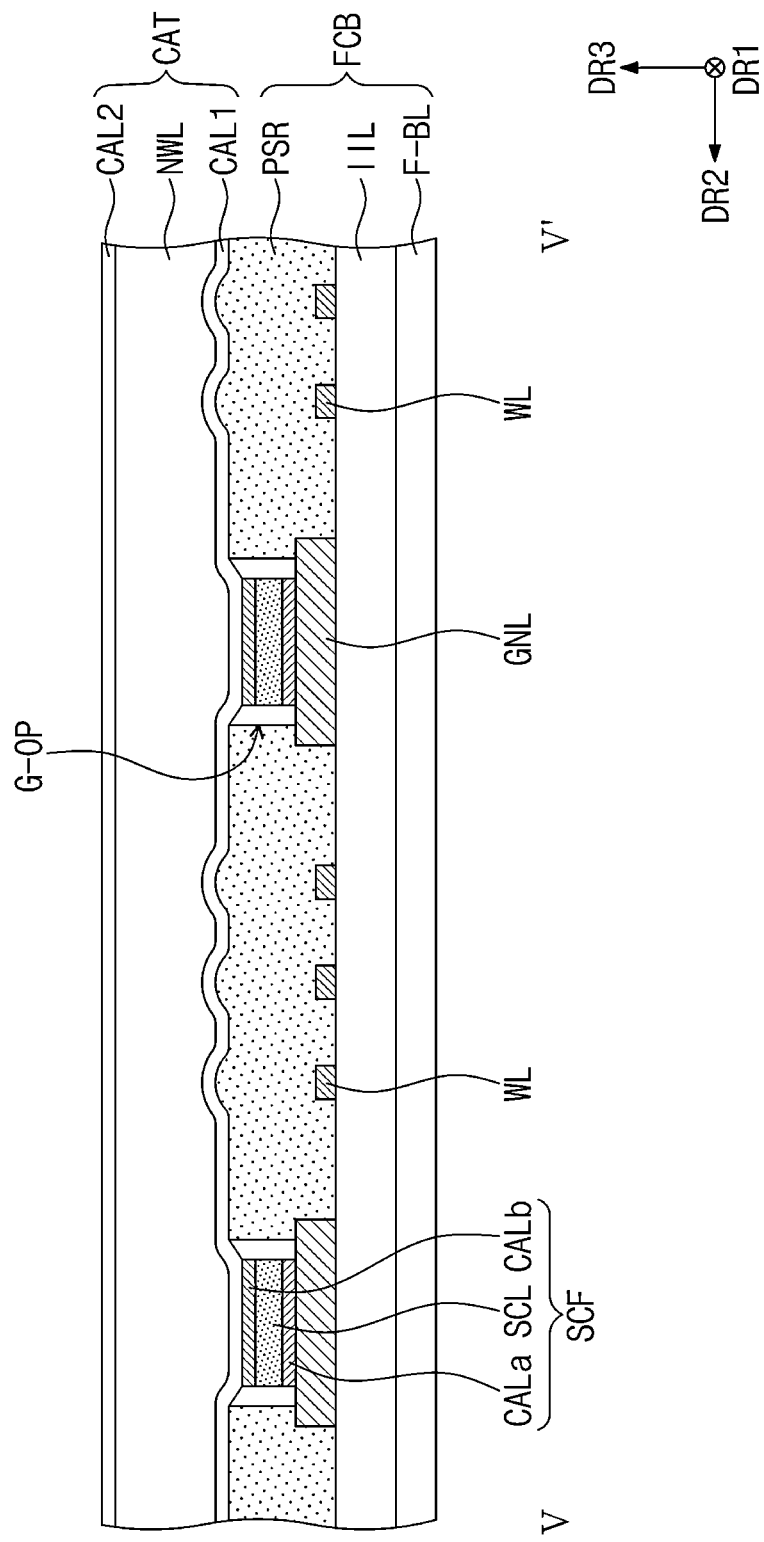
FIG. 7C is a sectional view of the flexible circuit film and the conductive adhesive tape taken along line V-V' illustrated in FIG. 7B.
Figure 8A:
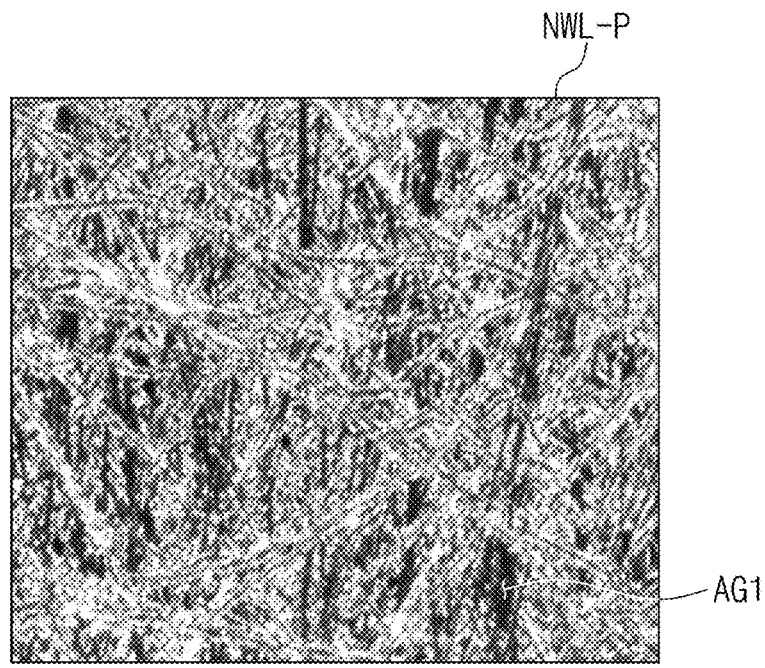
FIGS. 8A and 8B are views illustrating conductive nonwoven fabric layers according to an embodiment of the disclosure.
Figure 8B:
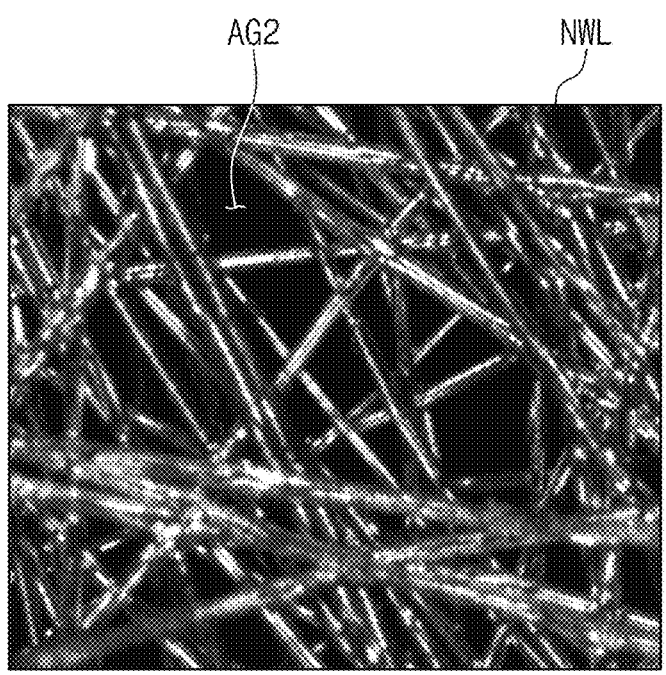

FIG. 7A is a rear view of the display device DD according to an embodiment of the disclosure. FIG. 7B is a plan view illustrating the flexible circuit film FCB and the conductive adhesive tape CAT according to an embodiment of the disclosure. FIG. 7C is a sectional view of the flexible circuit film FCB and the conductive adhesive tape CAT taken along line V-V' illustrated in FIG. 7B. FIGS. 8A and 8B are views illustrating conductive nonwoven fabric layers according to an embodiment of the disclosure. FIG. 7A is illustrated based on the state in which the display device DD illustrated in FIG. 5A is inverted.

Referring to FIG. 7A to FIG. 7C, the first sub-plate MP1 is disposed on the first digitizer DTM-1, and the second sub-plate MP2 is disposed on the second digitizer DTM-2. In an embodiment, a first opening MP-OP1, through which the first flexible circuit film FCB1, is exposed is defined in the first sub-plate MP1, and a second opening MP-OP2, through which the second flexible circuit film FCB2 is exposed, is defined in the second sub-plate MP2. A first cut-away portion MP-C1 is defined in the first sub-plate MP1, and a second cut-away portion MP-C2 is defined in the second sub-plate MP2. A first magnetic-field shielding sheet MSM1 is disposed in the first cut-away portion MP-C1, and a second magnetic-field shielding sheet MSM2 is disposed in the second cut-away portion MP-C2. The first magnetic-field shielding sheet MSM1 is attached to the first digitizer DTM-1, and the second magnetic-field shielding sheet MSM2 is attached to the second digitizer DTM-2.

An opening corresponding to the through-hole LTH may be defined in the first sub-plate MP1. Third to sixth magnetic-field shielding sheets MSM3 to MSM6 may be attached onto the first sub-plate MP1, and seventh and eighth magnetic-field shielding sheets MSM7 and MSM8 may be additionally attached onto the second sub-plate MP2.

When the bending area BA (refer to FIG. 3A) of the display module DM is bent, the second area NBA2 (refer to FIG. 3A) of the display module DM may be seated on the rear surface of the second sub-plate MP2. The flexible circuit film FCB coupled to the second area NBA2 may also be disposed on the rear surface of the second sub-plate MP2, and the flexible circuit film FCB may be coupled to the second sub-plate MP2 by the conductive adhesive tape CAT. The flexible circuit film FCB may be disposed at a position not overlapping the first to eighth magnetic-field shielding sheets MSM1 to MSM8 on the plane.

One surface (hereinafter, referred to as the rear surface) of the flexible circuit film FCB may face the support plate MP (particularly, the second sub-plate MP2). The flexible circuit film FCB may include a film base layer F-BL, an intermediate insulating layer IIL, a wiring layer WL, and a cover layer PSR. The wiring layer WL and the intermediate insulating layer IIL may be disposed on the film base layer F-BL. The wiring layer WL and the intermediate insulating layer IIL may each be constituted by a plurality of layers sequentially staked in the third direction DR3. The cover layer PSR may form or define the rear surface of the flexible circuit film FCB. The cover layer PSR may be a colored synthetic resin layer.

A ground opening G-OP for exposing the ground wire GNL may be defined or formed in the rear surface of the flexible circuit film FCB. The conductive adhesive tape CAT disposed between the flexible circuit film FCB and the support plate MP (particularly, the second sub-plate MP2) may be electrically connected with the ground wire GNL exposed through the ground opening G-OP.

In an embodiment of the disclosure, a step compensation film SCF may be disposed between the ground wire GNL and the conductive adhesive tape CAT. The step compensation film SCF is disposed in the ground opening G-OP and electrically connected to the ground wire GNL. In an embodiment, the step compensation film SCF may compensate for a step of the cover layer PSR caused by the ground opening G-OP. The step compensation film SCF includes a step compensation layer SCL and first and second conductive adhesives CALa and CALb. The step compensation layer SCL is a base layer of the step compensation film SCF. The step compensation layer SCL may have a thickness sufficient to compensate for a step between the cover layer PSR and the ground wire GNL. The step compensation layer SCL may include a material having electrical conductivity. The first conductive adhesive CALa is disposed between the ground wire GNL and the step compensation layer SCL, and the second conductive adhesive CALb is disposed between the step compensation layer SCL and the conductive adhesive tape CAT. Alternatively, the second conductive adhesive CALb may be omitted.

The rear surface of the flexible circuit film FCB may have an uneven surface structure due to the ground opening G-OP and the wiring layer WL. The flexible circuit film FCB may include a mounting area MA on which relatively large drive elements are mounted and a wiring area WA on which relatively small drive elements are mounted or only the wiring layer WL is disposed. In such an embodiment, the flexibility of the mounting area MA may be decreased by the relatively large drive elements, and therefore the mounting area MA may be relatively vulnerable to an external impact or pressing.

In an embodiment, the conductive adhesive tape CAT may be disposed on the rear surface of the flexible circuit film FCB in a size sufficient to entirely cover the rear surface. In such an embodiment where the conductive adhesive tape CAT is attached to the rear surface of the flexible circuit film FCB, the conductive adhesive tape CAT may be electrically connected with the ground wire GNL through the step compensation film SCF. The conductive adhesive tape CAT may receive a ground voltage from the flexible circuit film FCB.

The conductive adhesive tape CAT may include the conductive nonwoven fabric layer NWL, the first conductive adhesive layer CAL1, and the second conductive adhesive layer CAL2.

In an embodiment of the disclosure, the conductive nonwoven fabric layer NWL may be a conductive nonwoven fabric layer on which a cire process is not performed. In an embodiment, as illustrated in FIG. 8A, the fraction of the volume of voids AG1 over the total volume of a conductive nonwoven fabric layer NWL-P on which a cire process is performed is low, whereas as illustrated in FIG. 8B, the fraction of the volume of voids AG2 over the total volume of the conductive nonwoven fabric layer NWL on which a cire process is not performed is high. In an embodiment, as described above, the conductive nonwoven fabric layer NWL having a high void fraction is included in the conductive adhesive tape CAT, even though the rear surface of the flexible circuit film FCB has an uneven surface structure, the uneven surface structure may be alleviated by the voids AG2. In such an embodiment, due to the voids AG2 of the conductive nonwoven fabric layer NWL, the surface structure of the flexible circuit film FCB may not transition toward the support plate MP, and thus deformation of the support plate MP may be effectively prevented. Accordingly, a phenomenon in which deformation of the support plate MP is viewed as stain on the display device DD may be effectively prevented or substantially reduced, and the entire reliability of the display device DD may be improved.

Figure 9A:
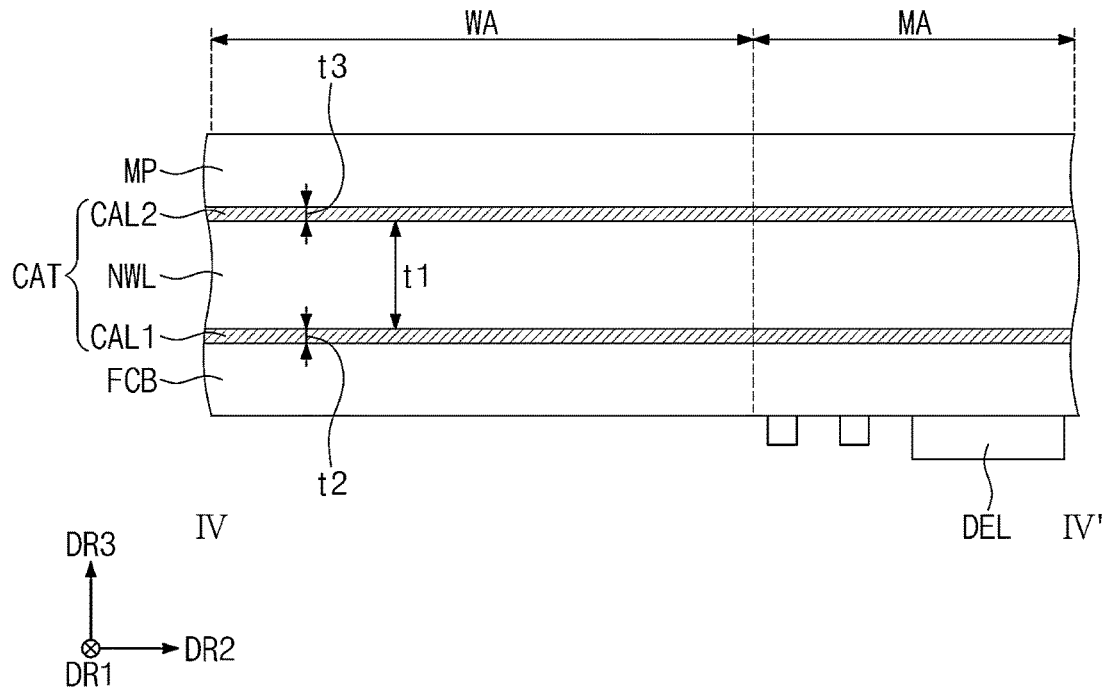
FIGS. 9A and 9B are sectional views of the conductive adhesive tape, a support plate, and the flexible circuit film taken along line IV-IV' illustrated in FIG. 7A.
Figure 9B:
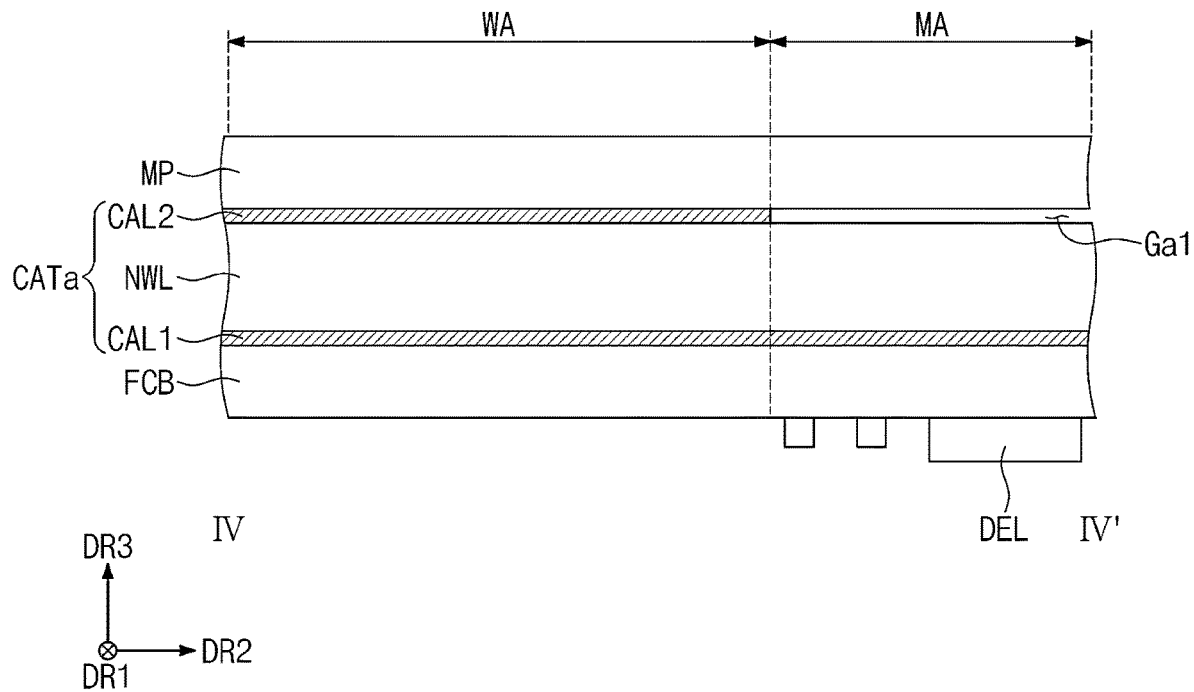

FIGS. 9A and 9B are sectional views of conductive adhesive tapes CAT and CATa, the support plate MP, and the flexible circuit film FCB taken along line IV-IV' illustrated in FIG. 7A.

Referring to FIG. 9A, in an embodiment, the first conductive adhesive layer CAL1 of the conductive adhesive tape CAT is coupled to the flexible circuit film FCB, and the second conductive adhesive layer CAL2 of the conductive adhesive tape CAT is coupled to the support plate MP. The conductive nonwoven fabric layer NWL is disposed between the first conductive adhesive layer CAL1 and the second conductive adhesive layer CAL2.

The conductive nonwoven fabric layer NWL may have a first thickness t1. In an embodiment of the disclosure, the first thickness t1 may be in a range of about 50 μm to about 130 μm. The first conductive adhesive layer CAL1 may have a second thickness t2, and the second conductive adhesive layer CAL2 may have a third thickness t3. The first conductive adhesive layer CAL1 and the second conductive adhesive layer CAL2 may have a same thickness as each other or different thicknesses from each other. The first thickness t1 of the conductive nonwoven fabric layer NWL may be greater than the second and third thicknesses t2 and t3 of the first and second conductive adhesive layers CAL1 and CAL2. In an embodiment of the disclosure, each of the second and third thicknesses t2 and t3 may be about 15 μm smaller than the first thickness t1. The first to third thicknesses t1, t2, and t3 are not limited thereto and may be variously modified based on design conditions.

The conductive adhesive tape CAT may provide, to the support plate MP, a ground voltage provided from the flexible circuit film FCB. In an embodiment, as described above, the ground wire GNL of the flexible circuit film FCB, the conductive adhesive tape CAT, and the support plate MP may be electrically connected to form a static-electricity path. When static electricity is generated, the static electricity may be discharged through the static-electricity path, and thus the drive elements DEL mounted on the flexible circuit film FCB or the driving chip DIC (refer to FIG. 7A) mounted on the display panel DP may be effectively prevented from being damaged by the static electricity.

In an embodiment, the conductive nonwoven fabric layer NWL has a high electrical conductivity and a high void fraction. Accordingly, in such an embodiment, the conductive nonwoven fabric layer NWL may alleviate deformation of the support plate MP caused by the uneven surface structure of the flexible circuit film FCB without deteriorating electrostatic discharge characteristics.

In an embodiment of the disclosure, the first thickness t1 of the conductive nonwoven fabric layer NWL may be greater than the sum of the second thickness t2 of the first conductive adhesive layer CAL1 and the third thickness t3 of the second conductive adhesive layer CAL2. In such an embodiment where the first thickness t1 of the conductive nonwoven fabric layer NWL is greater than the sum of the second thickness t2 of the first conductive adhesive layer CAL1 and the third thickness t3 of the second conductive adhesive layer CAL2, deformation of the support plate MP may be more effectively alleviated by voids defined or formed in the conductive nonwoven fabric layer NWL.

In an embodiment, as shown in FIG. 9A, the second conductive adhesive layer CAL2 of the conductive adhesive tape CAT is disposed in both the mounting area MA and the wiring area WA. However, the disclosure is not limited thereto. In an alternative embodiment, as illustrated in FIG. 9B, the second conductive adhesive layer CAL2 may be omitted from the mounting area MA. A double-sided adhesive portion disposed in the wiring area WA of the conductive adhesive tape CATa may have double-sided adhesive characteristics, whereas a single-sided adhesive portion disposed in the mounting area MA may have single-sided adhesive characteristics. In such an embodiment, as the second conductive adhesive layer CAL2 is removed from the mounting area MA, a gap Gal may be formed between the conductive nonwoven fabric layer NWL and the support plate MP in the mounting area MA. The support plate MP and the conductive adhesive tape CATa may be spaced apart from each other (or, may not be attached to each other) due to the gap Gal, and therefore the uneven surface structure of the flexible circuit film FCB may not be transferred to the support plate MP. Accordingly, deformation of the support plate MP in the mounting area MA may be effectively prevented or substantially decreased.

Figure 10B:
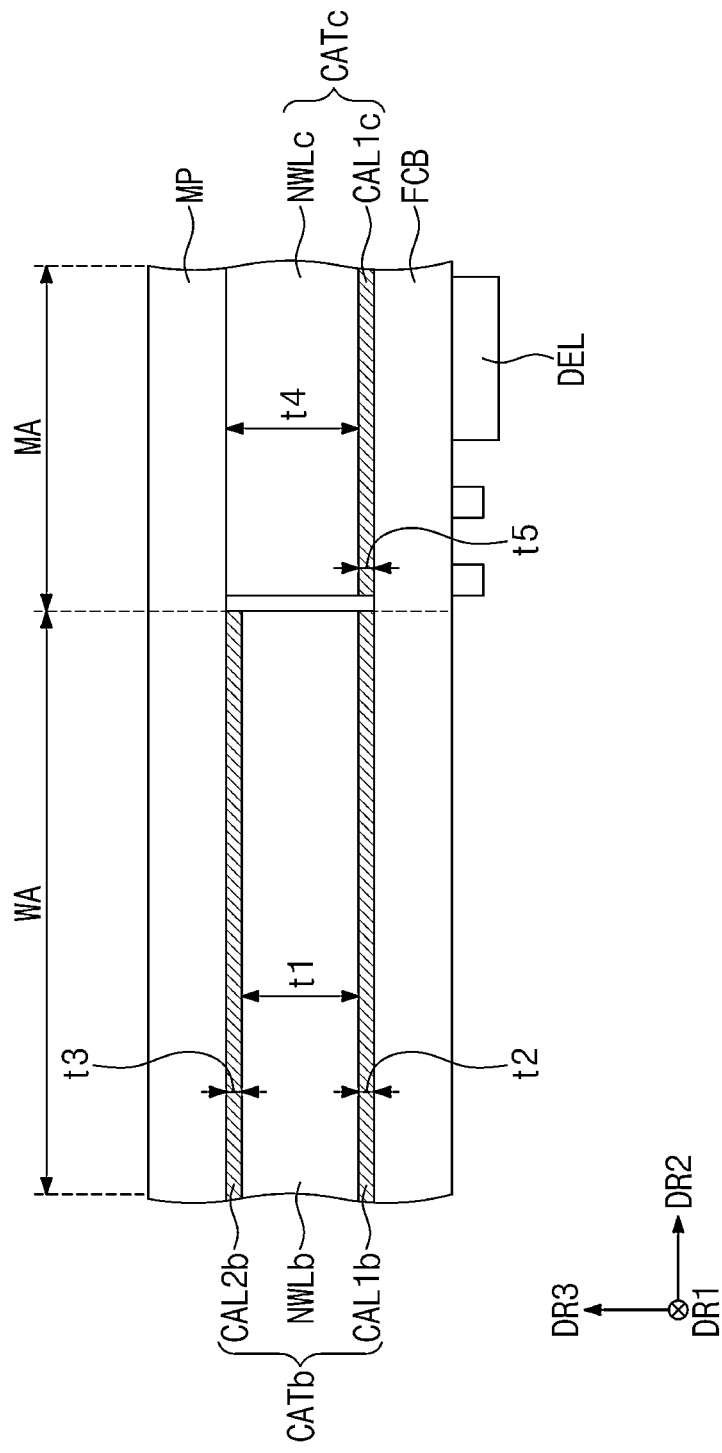
FIG. 10B is a sectional view illustrating a coupled state of the first and second conductive adhesive tapes, the support plate, and the flexible circuit film according to an embodiment of the disclosure.

FIG. 10A is a rear view illustrating the flexible circuit film FCB and first and second conductive adhesive tapes CATb and CATc according to an embodiment of the disclosure. FIG. 10B is a sectional view illustrating a coupled state of the first and second conductive adhesive tapes CATb and CATc, the support plate MP, and the flexible circuit film FCB according to an embodiment of the disclosure.

Referring to FIGS. 10A and 10B, the first and second conductive adhesive tapes CATb and CATc are disposed between the flexible circuit film FCB and the support plate MP. The first conductive adhesive tape CATb is disposed to correspond to the wiring area WA of the flexible circuit film FCB, and the second conductive adhesive tape CATc is disposed to correspond to the mounting area MA of the flexible circuit film FCB. The first and second conductive adhesive tapes CATb and CATc may be spaced apart from each other in the second direction DR2.

The first conductive adhesive tape CATb includes a first conductive nonwoven fabric layer NWLb and first and second conductive adhesive layers CAL1*b* and CAL2*b*, and the second conductive adhesive tape CATc includes a second conductive nonwoven fabric layer NWLc and a third conductive adhesive layer CAL1*c*. The first conductive nonwoven fabric layer NWLb may have a different thickness from the second conductive nonwoven fabric layer NWLc. In an embodiment of the disclosure, the first conductive nonwoven fabric layer NWLb may have a first thickness t1, and the second conductive nonwoven fabric layer NWLc may have a fourth thickness t4 greater than the first thickness t1. The third conductive adhesive layer CAL1*c* may have a fifth thickness t5 greater than or equal to the second and third thicknesses t2 and t3 of the first and second conductive adhesive layers CAL1*b* and CAL2*b*.

In such an embodiment where the fourth thickness t4 of the second conductive nonwoven fabric layer NWLc is greater than the first thickness t1 of the first conductive nonwoven fabric layer NWLb, the second conductive nonwoven fabric layer NWLc may more effectively alleviate the uneven surface structure of the flexible circuit film FCB than the first conductive nonwoven fabric layer NWLb. Accordingly, deformation of the support plate MP in the mounting area MA may be effectively prevented or substantially decreased.

In an embodiment, the first conductive adhesive tape CATb may have double-sided adhesive characteristics, whereas the second conductive adhesive tape CATc may have single-sided adhesive characteristics. In such an embodiment, the second conductive adhesive tape CATc may not be attached to the support plate MP. Although not illustrated, a gap may be formed between the second conductive adhesive tape CATc and the support plate MP. The support plate MP and the second conductive adhesive tape CATc may be spaced apart from each other (or, may not be attached to each other) due to the gap, and therefore the uneven surface structure of the flexible circuit film FCB may not be transferred to the support plate MP. Accordingly, deformation of the support plate MP in the mounting area MA may be effectively prevented or substantially decreased.

Although FIG. 10B illustrates an embodiment having a structure in which the first and second conductive adhesive tapes CATb and CATc include the first and second conductive nonwoven fabric layers NWLb and NWLc, respectively, the disclosure is not limited thereto. In an embodiment, at least one of the first and second conductive adhesive tapes CATb and CATc may include a conductive nonwoven fabric layer.

Figure 11A:
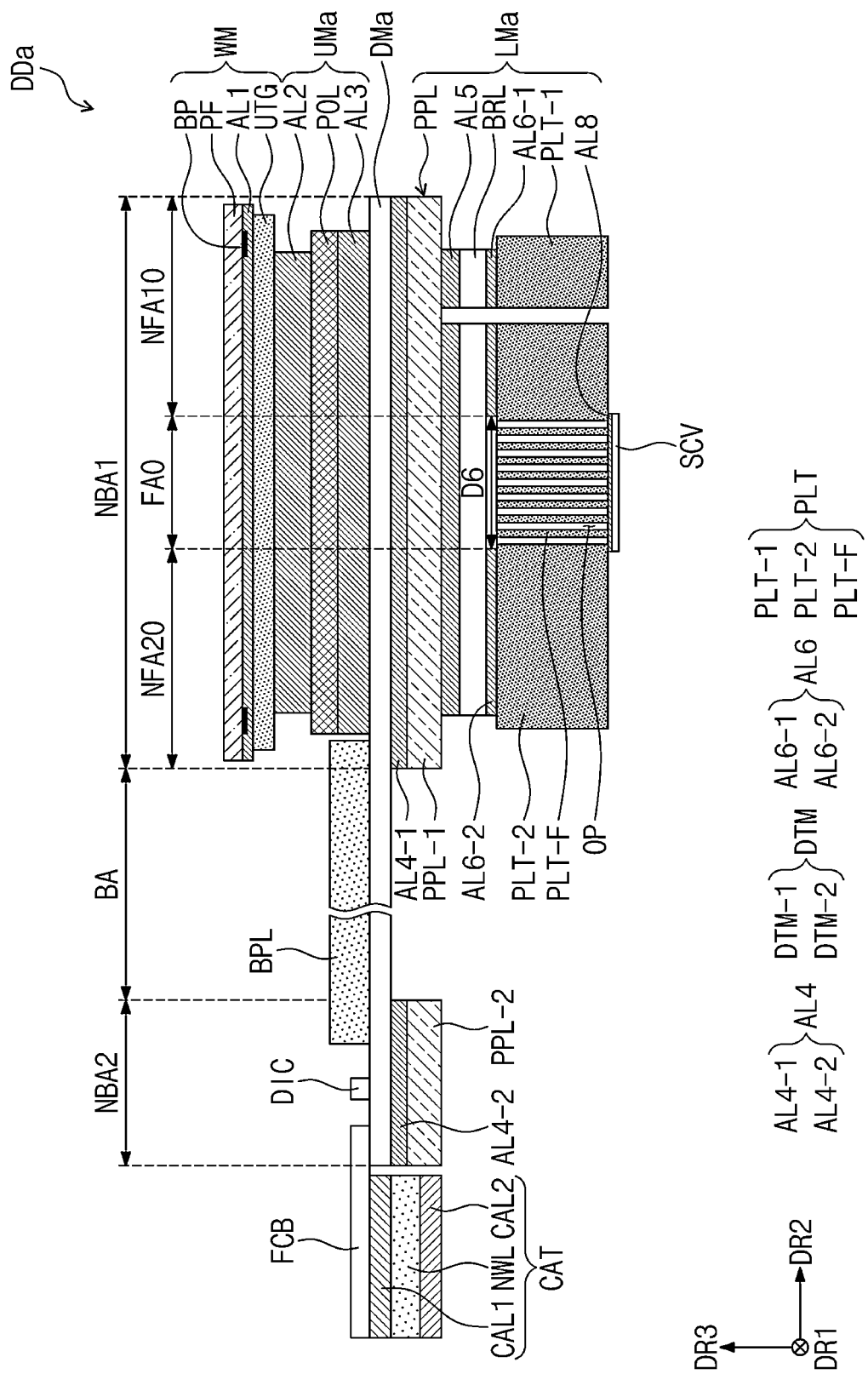
FIG. 11A is a sectional view of a display device according to an embodiment of the disclosure.
Figure 11B:
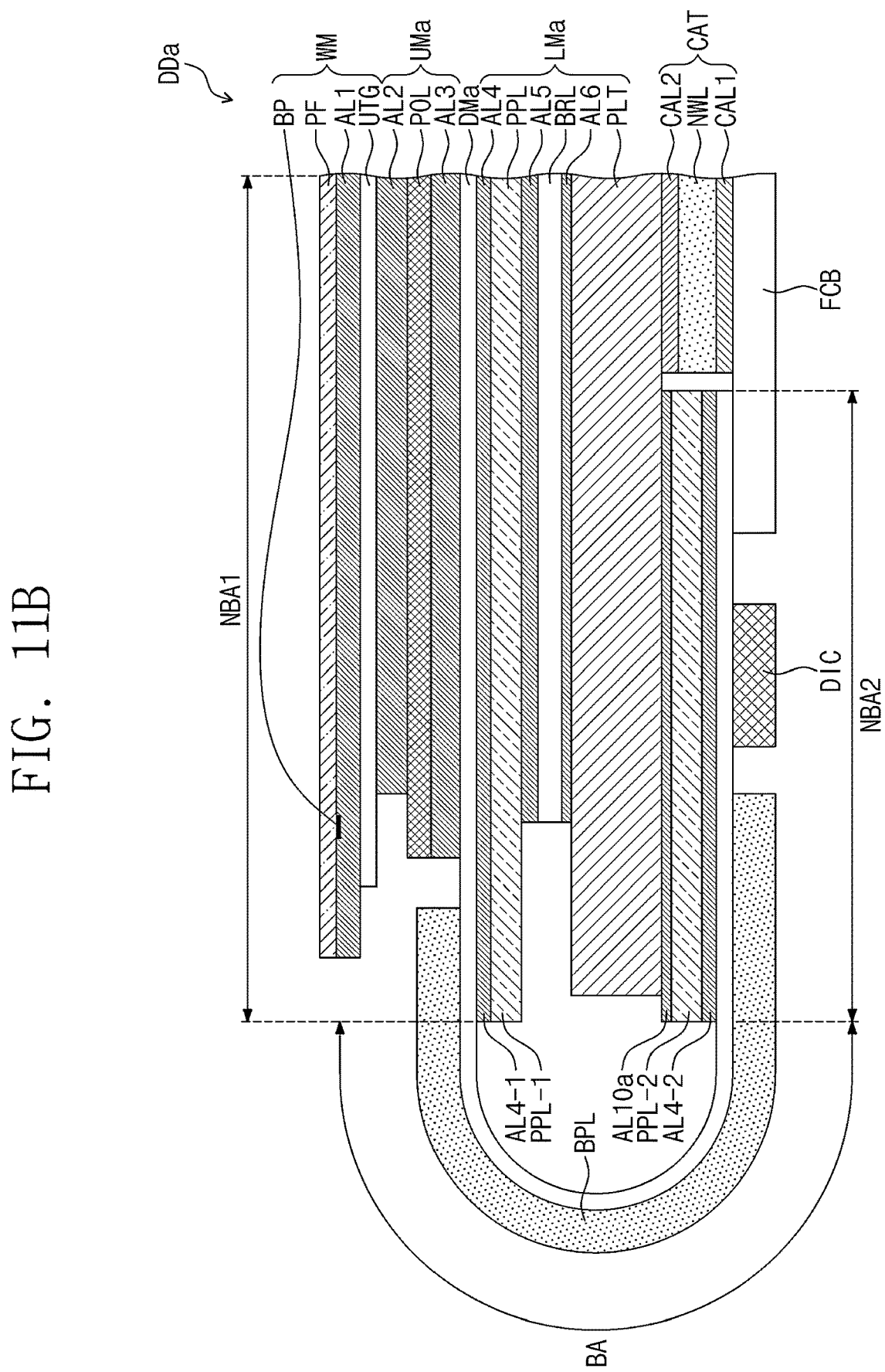
FIG. 11B is a sectional view illustrating a bent state of a display module according to an embodiment of the disclosure.

FIG. 11A is a sectional view of a display device DDa according to an embodiment of the disclosure, and FIG. 11B is a sectional view illustrating a bent state of a display module DMa according to an embodiment of the disclosure. The same or like components or elements in FIGS. 11A and 11B as those described above with reference to FIGS. 5A and 5B will be labeled with the same or like reference characters, and any repetitive detailed description thereof will be omitted or simplified.

Referring to FIGS. 11A and 11B, an embodiment of the display device DDa includes a window WM, an upper module UMa, the display module DMa, and a lower module LMa. Components disposed between the window WM and the display module DMa are collectively referred to as the upper module UMa, and components disposed under the display module DMa are collectively referred to as the lower module LMa.

In an embodiment, the upper module UMa may include a polarizer film POL. In such an embodiment, the polarizer film POL may replace the anti-reflection layer ARL described with reference to FIG. 4. In such an embodiment, where the polarizer film POL is disposed, the anti-reflection layer ARL may be omitted from the display module DMa.

The lower module LMa may include a panel protection layer PPL, a barrier layer BRL, a support layer PLT, a cover layer SCV, and fourth to eighth adhesive layers AL4 to AL8. The fourth to eighth adhesive layers AL4 to AL8 may include an adhesive such as a PSA or an OCA.

The support layer PLT is disposed under the barrier layer BRL. The support layer PLT supports components disposed over the support layer PLT and maintains a flat state and a folded state of the display device DDa. The support layer PLT has conductivity and has a greater strength than the barrier layer BRL. The support layer PLT includes at least a first support portion PLT-1 corresponding to a first non-folding area NFA10 and a second support portion PLT-2 corresponding to a second non-folding area NFA20. The first support portion PLT-1 and the second support portion PLT-2 are spaced apart from each other in the second direction DR2.

In an embodiment, the support layer PLT may include a folding portion PLT-F that corresponds to a folding area FAO and that is disposed between the first support portion PLT-1 and the second support portion PLT-2. In an embodiment, a plurality of openings OP is defined in the folding portion PLT-F. The plurality of openings OP may be arranged in a way such that the folding portion PLT-F has a grid shape on the plane. The first support portion PLT-1, the second support portion PLT-2, and the folding portion PLT-F may have an integrated shape or integrally formed with each other as a single unitary unit.

The folding portion PLT-F may prevent or reduce infiltration of foreign matter into a central area of the barrier layer BRL in the folding motions illustrated in FIGS. 1B and 1C. In an embodiment, the flexibility of the folding portion PLT-F is improved by the plurality of openings OP. In an embodiment, the flexibility of the support layer PLT may be improved because the sixth adhesive layer AL6 is not disposed on the folding portion PLT-F. In an alternative embodiment of the disclosure, the folding portion PLT-F may be omitted. In such an embodiment, the support layer PLT includes only the first support portion PLT-1 and the second support portion PLT-2 spaced apart from each other.

The support layer PLT may absorb an external impact applied from below. The support layer PLT may include a metallic material such as stainless steel. A second panel protection layer PPL-2 may be attached to the support layer PLT through a tenth adhesive layer AL10a. Alternatively, the tenth adhesive layer AL10a may be omitted.

In an embodiment, a conductive adhesive tape CAT may be disposed on the rear surface of a flexible circuit film FCB. In an embodiment, as illustrated in FIG. 11B, the conductive adhesive tape CAT may be disposed between the flexible circuit film FCB and the support layer PLT in the state in which the display module DMa is bent. In an embodiment of the disclosure, the conductive adhesive tape CAT may be a double-sided adhesive tape. Accordingly, the flexible circuit film FCB may be fixed to the rear surface of the support layer PLT by the conductive adhesive tape CAT. The conductive adhesive tape CAT may serve to compensate for a step formed on the rear surface of the support layer PLT by the second panel protection layer PPL-2. In such an embodiment, the conductive adhesive tape CAT may have a thickness sufficient to compensate for the step.

The conductive adhesive tape CAT may include a conductive nonwoven fabric layer NWL, a first conductive adhesive layer CAL1, and a second conductive adhesive layer CAL2. The conductive nonwoven fabric layer NWL may be disposed between the first conductive adhesive layer CAL1 and the second conductive adhesive layer CAL2. The conductive nonwoven fabric layer NWL may have a configuration in which a nonwoven fabric material is plated with a metallic material such as copper or nickel. In an embodiment of the disclosure, the conductive nonwoven fabric layer NWL may be a nonwoven fabric layer on which a cire process is not performed and may have a lower smoothness and a higher void fraction than the nonwoven fabric layer NWL-P (refer to FIG. 8A) on which a cire process is performed.

The first conductive adhesive layer CAL1 is disposed between the conductive nonwoven fabric layer NWL and the flexible circuit film FCB, and the second conductive adhesive layer CAL2 is disposed between the conductive nonwoven fabric layer NWL and the rear surface of the support layer PLT. The first and second conductive adhesive layers CAL1 and CAL2 may include a conductive adhesive material.

In an embodiment, the first conductive adhesive layer CAL1 may be electrically connected with a ground wire GNL (refer to FIG. 7B) of the flexible circuit film FCB. Accordingly, the conductive adhesive tape CAT may receive a ground voltage from the flexible circuit film FCB and may transfer the received ground voltage to the support layer PLT. A static-electricity path formed by electrical connection of the ground wire GNL, the conductive adhesive tape CAT, and the support layer PLT may be provided to the display device DDa.

Accordingly, in such an embodiment, when static electricity is generated, the static electricity may be discharged through the static-electricity path, and thus drive elements DEL (refer to FIG. 7A) mounted on the flexible circuit film FCB or a driving chip DIC mounted on a display panel DP may be effectively prevented from being damaged by the static electricity.

In such an embodiment, the conductive nonwoven fabric layer NWL having a high void fraction is included in the conductive adhesive tape CAT, even though the rear surface of the flexible circuit film FCB has an uneven surface structure, the uneven surface structure may be alleviated by voids. Accordingly, the surface structure of the flexible circuit film FCB may be effectively prevented from being transferred toward the support layer PLT to cause deformation of the support layer PLT, and thus a phenomenon in which deformation of the support layer PLT is viewed as stain on the display device DDa may be effectively prevented or substantially reduced.

According to embodiments of the disclosure, the conductive nonwoven fabric layer having a high void fraction, on which a cire process is not performed, is used for the conductive adhesive tape, and therefore even though the rear surface of the flexible circuit film has an uneven surface structure, the surface structure of the flexible circuit film may not be transferred toward the support plate due to voids, and deformation of the support plate may be prevented. Accordingly, a phenomenon in which deformation of the support plate is viewed as stain on the display device may be effectively prevented or substantially reduced, and the entire reliability of the display device may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:
1. A display device comprising:
a display panel;
a lower module disposed under the display panel;
a circuit film coupled to the display panel, wherein a portion of the circuit film is disposed on a rear surface of the lower module; and
a conductive adhesive tape disposed between the lower module and the circuit film, wherein the conductive adhesive tape includes:
a conductive nonwoven fabric layer;
a first conductive adhesive layer disposed between the conductive nonwoven fabric layer and the circuit film; and
a second conductive adhesive layer disposed between the conductive nonwoven fabric layer and the lower module.

2. The display device of claim 1, wherein the conductive nonwoven fabric layer includes a metallic material.

3. The display device of claim 1, wherein a plurality of voids is defined in the conductive nonwoven fabric layer.

4. The display device of claim 1, wherein the conductive nonwoven fabric layer has a greater thickness than a thickness of each of the first and second conductive adhesive layers.

5. The display device of claim 4, wherein the conductive nonwoven fabric layer has a thickness greater than a sum of a thickness of the first conductive adhesive layer and a thickness of the second conductive adhesive layer.

6. The display device of claim 1, wherein the conductive adhesive tape includes:
a double-sided adhesive portion attached to the lower module and the circuit film; and
a single-sided adhesive portion attached to one of the lower module and the circuit film.

7. The display device of claim 6, wherein the second conductive adhesive layer is not disposed in the single-sided adhesive portion such that a gap is defined between the single-sided adhesive portion and the lower module.

8. The display device of claim 1, wherein
the display panel includes a first non-folding area, a second non-folding area, and a folding area disposed between the first non-folding area and the second non-folding area, the lower module includes:
a first sub-plate overlapping the first non-folding area; and
a second sub-plate overlapping the second non-folding area and spaced apart from the first sub-plate.

9. The display device of claim 8,
wherein a separation space between the first and second sub-plates overlaps the folding area, and
wherein the conductive adhesive tape is disposed between the second sub-plate and the circuit film.

10. The display device of claim 8,
wherein the lower module further includes a support layer overlapping the first non-folding area and the second non-folding area, and
wherein the support layer is disposed between the display panel and the first and second sub-plates.

11. The display device of claim 10, wherein the support layer includes a fiber reinforced composite.

12. The display device of claim 10, wherein the support layer includes:
a first support portion corresponding to the first non-folding area;
a second support portion corresponding to the second non-folding area; and
a folding portion disposed between the first support portion and the second support portion, wherein a plurality of openings is defined in the folding portion.

13. The display device of claim 1,
wherein the display panel includes a sensing area, through which an optical signal passes, and a display area adjacent to the sensing area, and
wherein a through-hole is defined in the lower module to correspond to the sensing area.

14. The display device of claim 1,
wherein the display panel includes a first non-folding area, a second non-folding area, and a folding area disposed between the first non-folding area and the second non-folding area,
the lower module includes a support layer overlapping the first non-folding area and the second non-folding area.

15. The display device of claim 14,
wherein the support layer includes a metallic material, and
wherein the conductive adhesive tape is disposed between the support layer and the circuit film.

16. The display device of claim 14, wherein the support layer includes:
a first support portion corresponding to the first non-folding area;
a second support portion corresponding to the second non-folding area; and
a folding portion disposed between the first support portion and the second support portion, wherein a plurality of openings is defined in the folding portion.

17. A display device comprising:
a display panel;
a lower module disposed under the display panel;
a circuit film coupled to the display panel, wherein a portion of the circuit film is disposed on a rear surface of the lower module;
a first conductive adhesive tape disposed between the lower module and a first area of the circuit film; and
a second conductive adhesive tape disposed between the lower module and a second area of the circuit film,
wherein at least one selected from the first and second conductive adhesive tapes includes a conductive nonwoven fabric layer.

18. The display device of claim 17, wherein the first conductive adhesive tape includes:
a first conductive nonwoven fabric layer;
a first conductive adhesive layer disposed between the first conductive nonwoven fabric layer and the first area of the circuit film; and
a second conductive adhesive layer disposed between the first conductive nonwoven fabric layer and the lower module.

19. The display device of claim 18, wherein the second conductive adhesive tape includes:
a second conductive nonwoven fabric layer; and
a third conductive adhesive layer disposed between the second conductive nonwoven fabric layer and the first area of the circuit film.

20. The display device of claim 19, wherein the first conductive nonwoven fabric layer and the second conductive nonwoven fabric layer have different thicknesses from each other.

21. The display device of claim 19, wherein each of the first and second conductive nonwoven fabric layers includes a metallic material.

22. The display device of claim 19, wherein a plurality of voids is defined in each of the first and second conductive nonwoven fabric layers.

23. An electronic device comprising:
a display device including a sensing area, through which an optical signal passes, and a display area adjacent to the sensing area; and
an electro-optical module disposed under the display device to overlap the sensing area, wherein the electro-optical module receives the optical signal, wherein the display device includes:
a display panel overlapping the sensing area and the display area;
a lower module disposed under the display panel;
a circuit film coupled to the display panel, wherein a portion of the circuit film is disposed on a rear surface of the lower module; and
a conductive adhesive tape disposed between the lower module and the circuit film, and
wherein the conductive adhesive tape includes:
a conductive nonwoven fabric layer;
a first conductive adhesive layer disposed between the conductive nonwoven fabric layer and the circuit film; and
a second conductive adhesive layer disposed between the conductive nonwoven fabric layer and the lower module.

24. The electronic device of claim 23, wherein a plurality of voids is defined in the conductive nonwoven fabric layer.

25. The electronic device of claim 23, wherein the conductive nonwoven fabric layer has a thickness greater than a sum of a thickness of the first conductive adhesive layer and a thickness of the second conductive adhesive layer.

26. The electronic device of claim 23, wherein the conductive adhesive tape includes:
a double-sided adhesive portion attached to the lower module and the circuit film; and
a single-sided adhesive portion attached to one of the lower module and the circuit film.

27. The electronic device of claim 26, wherein the second conductive adhesive layer is not disposed in the single-sided adhesive portion such that a gap is defined between the single-sided adhesive portion and the lower module.

28. The electronic device of claim 23,
wherein a through-hole is defined in the lower module to correspond to the sensing area, and
wherein the electro-optical module overlaps the through-hole.

29. The electronic device of claim 23, wherein the display panel includes a first pixel disposed in the display area and a second pixel disposed in the sensing area.

30. The electronic device of claim 29, wherein the display area has a higher resolution than the sensing area.

* * * * *